United States Patent
Liu et al.

(10) Patent No.: US 12,261,697 B2
(45) Date of Patent: Mar. 25, 2025

(54) COMMUNICATION METHOD AND APPARATUS

(71) Applicant: Huawei Technologies Co., Ltd., Shenzhen (CN)

(72) Inventors: Nannan Liu, Beijing (CN); Junren Chang, Beijing (CN); Jun Wang, Shanghai (CN); Dongdong Wei, Shanghai (CN); Chang Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 17/657,033

(22) Filed: Mar. 29, 2022

(65) Prior Publication Data

US 2022/0216946 A1 Jul. 7, 2022

Related U.S. Application Data

(63) Continuation of application No. PCT/CN2019/109775, filed on Sep. 30, 2019.

(51) Int. Cl.
*H04L 1/08* (2006.01)
*H04L 1/1812* (2023.01)
*H04W 72/20* (2023.01)

(52) U.S. Cl.
CPC .............. *H04L 1/08* (2013.01); *H04L 1/1812* (2013.01); *H04W 72/20* (2023.01)

(58) Field of Classification Search
CPC ......... H04L 1/08; H04L 1/1812; H04W 72/20
USPC ........................................................ 370/329
See application file for complete search history.

(56) References Cited

U.S. PATENT DOCUMENTS

| | | | | |
|---|---|---|---|---|
| 10,039,030 | B2* | 7/2018 | Seo | H04L 1/20 |
| 10,367,677 | B2* | 7/2019 | Parkvall | H04J 11/0056 |
| 10,630,410 | B2* | 4/2020 | Parkvall | H04L 5/1469 |
| 10,764,866 | B2* | 9/2020 | Loehr | H04W 72/56 |
| 10,790,941 | B2* | 9/2020 | Zhang | H04W 72/0446 |
| 10,834,777 | B2* | 11/2020 | Babaei | H04W 76/38 |

(Continued)

FOREIGN PATENT DOCUMENTS

| | | |
|---|---|---|
| CN | 103716141 A | 4/2014 |
| CN | 105262570 A | 1/2016 |

(Continued)

OTHER PUBLICATIONS

Huawei et al., "Sidelink physical layer structure for NR V2X", 3GPP TSG RAN WG1 Meeting #95, R1-1812206, Spokane, WA, US, Nov. 12-16, 2018, 12 pages.

(Continued)

*Primary Examiner* — Melvin H Pollack
(74) *Attorney, Agent, or Firm* — Slater Matsil, LLP

(57) ABSTRACT

A communication method and apparatus are applied to fields such as V2X, vehicle to everything, an intelligent connected vehicle, assisted driving, and intelligent driving. The method includes: a first terminal device determines a first new data indicator NDI based on an identifier of a first destination address and an identifier of a first hybrid automatic repeat request HARQ process, where the first NDI is included in first sidelink control information SCI, and the first SCI is used to schedule first data; and the first terminal device sends, through a sidelink, the first SCI and/or the first data to a second terminal device.

20 Claims, 4 Drawing Sheets

(56) References Cited

U.S. PATENT DOCUMENTS

| | | | | |
|---|---|---|---|---|
| 10,869,296 B2* | 12/2020 | Loehr | | H04W 72/02 |
| 10,931,426 B2* | 2/2021 | Desai | | H04L 1/1861 |
| 10,939,417 B2* | 3/2021 | Chae | | H04W 24/10 |
| 10,945,240 B2* | 3/2021 | Chae | | H04L 5/00 |
| 10,966,226 B2* | 3/2021 | Feng | | H04W 4/46 |
| 11,005,607 B2* | 5/2021 | Basu Mallick | | H04W 4/70 |
| 11,006,305 B2* | 5/2021 | Babaei | | H04L 5/0098 |
| 11,051,275 B2* | 6/2021 | Loehr | | H04W 72/04 |
| 11,063,719 B2* | 7/2021 | Wang | | H04L 5/0053 |
| 11,101,932 B2* | 8/2021 | Beale | | H04L 1/1816 |
| 11,115,938 B2* | 9/2021 | Chae | | H04W 52/383 |
| 11,147,090 B2* | 10/2021 | Lunttila | | H04L 1/1854 |
| 11,219,086 B2* | 1/2022 | Iyer | | H04W 4/70 |
| 11,330,560 B2* | 5/2022 | Chae | | H04W 72/12 |
| 11,363,626 B2* | 6/2022 | Zhou | | H04L 5/0094 |
| 11,432,369 B2* | 8/2022 | Xiong | | H04L 5/0091 |
| 11,563,526 B2* | 1/2023 | Yeo | | H04L 1/1819 |
| 11,595,179 B2* | 2/2023 | Miao | | H04B 7/024 |
| 11,601,229 B2* | 3/2023 | Fröberg | | H04L 1/1861 |
| 11,785,607 B2* | 10/2023 | Park | | H04W 72/23 370/329 |
| 11,800,397 B2* | 10/2023 | Alfarhan | | H04W 74/00 |
| 11,800,531 B2* | 10/2023 | Shin | | H04W 72/30 |
| 11,800,560 B2* | 10/2023 | Yang | | H04L 1/1854 |
| 11,838,132 B2* | 12/2023 | Yeo | | H04L 1/1812 |
| 11,876,747 B2* | 1/2024 | Lee | | H04L 1/1864 |
| 11,902,023 B2* | 2/2024 | Faxer | | H04L 1/1887 |
| 11,902,980 B2* | 2/2024 | Yang | | H04L 5/0094 |
| 11,930,534 B2* | 3/2024 | Kim | | H04L 5/0055 |
| 11,936,482 B2* | 3/2024 | Zhao | | H04L 5/0057 |
| 11,968,037 B2* | 4/2024 | Hwang | | H04W 4/40 |
| 11,985,674 B2* | 5/2024 | Chatterjee | | H04W 72/1273 |
| 11,996,946 B2* | 5/2024 | Yoshioka | | H04L 1/1896 |
| 12,010,689 B2* | 6/2024 | Shin | | H04L 1/08 |
| 12,022,481 B2* | 6/2024 | Yang | | H04L 1/1671 |
| 2021/0243796 A1* | 8/2021 | Panteleev | | H04W 72/566 |
| 2021/0297193 A1* | 9/2021 | Noh | | H04L 1/1614 |
| 2021/0306824 A1* | 9/2021 | Li | | H04W 4/40 |
| 2021/0377912 A1* | 12/2021 | El Hamss | | H04L 1/1854 |
| 2022/0006571 A1* | 1/2022 | Basu Mallick | | H04L 5/0055 |
| 2022/0263638 A1* | 8/2022 | Zhao | | H04L 1/0038 |
| 2022/0321291 A1* | 10/2022 | Yoshioka | | H04W 72/0446 |
| 2022/0376829 A1* | 11/2022 | Zhao | | H04L 1/08 |
| 2023/0094711 A1* | 3/2023 | Wu | | H04L 1/1887 370/329 |
| 2023/0269035 A1* | 8/2023 | Fu | | H04L 5/0055 |
| 2024/0163017 A1* | 5/2024 | Jiang | | H04L 1/1864 |

FOREIGN PATENT DOCUMENTS

| | | | |
|---|---|---|---|
| CN | 108768597 A | 11/2018 | |
| CN | 109792594 A | 5/2019 | |
| JP | 7341257 B2 * | 9/2023 | H04B 7/024 |
| WO | 2019029652 A1 | 2/2019 | |
| WO | 2020166922 A1 | 8/2020 | |
| WO | WO-2021206528 A1 * | 10/2021 | H04L 1/1812 |
| WO | WO-2022006724 A1 * | 1/2022 | |

OTHER PUBLICATIONS

Huawei et al., "Sidelink physical layer procedures for NR V2X", 3GPP TSG RAN WG1 Meeting #96bis, R1-1903944, Xi'an, China, Apr. 8-12, 2019, 17 pages.

3GPP TS 36.212 V15.7.0 (Sep. 2019), 3rd Generation Partnership Project; Technical Specification Group Radio Access Network; Evolved Universal Terrestrial Radio Access (E-UTRA); Multiplexing and channel coding (Release 15), 246 pages.

CATT, "Discussion on physical layer procedures in NR V2X", 3GPP TSG RAN1 Meeting #95, R1-1812618, Spokane, WA, US, Nov. 12-16, 2018, 8 pages.

Huawei et al., "Discussion on HARQ support for NR sidelink", 3GPP TSG-RAN WG2#105bis, R2-1904879 (Revision of R2-1902049), Xi'an, China, Apr. 8-12, 2019, 5 pages.

3GPP TS 36.213 V15.7.0 (Sep. 2019), 3rd Generation Partnership Project; Technical Specification Group Radio Access Network; Evolved Universal Terrestrial Radio Access (E-UTRA); Physical layer procedures (Release 15), 551 pages.

Huawei et al., "Design and contents of PSCCH and PSFCH", 3GPP TSG RAN WG1 Meeting #95, R1-1813554, Spokane, WA, US, Nov. 12-16, 2018, 7 pages.

3GPP TS 36.321 V15.7.0 (Sep. 2019), 3rd Generation Partnership Project;Technical Specification Group Radio Access Network; Evolved Universal Terrestrial Radio Access (E-UTRA); Medium Access Control (MAC) protocol specification (Release 15), 134 pages.

3GPP TS 36.331 V15.7.0 (Sep. 2019), 3rd Generation Partnership Project; Technical Specification Group Radio Access Network; Evolved Universal Terrestrial Radio Access (E-UTRA); Radio Resource Control (RRC); Protocol specification (Release 15), 962 pages.

3GPP TS 38.212 V15.7.0 (Sep. 2019), 3rd Generation Partnership Project; Technical Specification Group Radio Access Network; NR; Multiplexing and channel coding (Release 15), 101 pages.

3GPP TS 38.214 V15.7.0 (Sep. 2019), 3rd Generation Partnership Project; Technical Specification Group Radio Access Network; NR; Physical layer procedures for data (Release 15), 106 pages.

3GPP TS 38.300 V15.7.0 (Sep. 2019), 3rd Generation Partnership Project; Technical Specification Group Radio Access Network; NR; NR and NG-RAN Overall Description; Stage 2 (Release 15), 99 pages.

3GPP TS 38.321 V15.7.0 (Sep. 2019), 3rd Generation Partnership Project; Technical Specification Group Radio Access Network; NR; Medium Access Control (MAC) protocol specification (Release 15), 78 pages.

* cited by examiner

Step 1: Tx UE -> Rx UE 1, HARQ process ID 1, new transmission (data 1) (NDI = 0);
Rx UE 1 -> Tx UE, ACK;
step 2: Tx UE -> Rx UE 2, HARQ process ID 1, new transmission (data 2) (NDI = 1);
Rx UE 2 -> Tx UE, ACK; and
step 3: Tx UE -> Rx UE 1, HARQ process ID 1, new transmission (data 3) (NDI = 0), where the Rx UE 1 incorrectly considers the data 3 as a retransmission of the data 1

FIG. 3

Step 1: Tx UE 1 -> Rx UE, HARQ process ID 1, new transmission (data 1) (NDI = 0); and
step 2: Tx UE 2 -> Rx UE, HARQ process ID 1, new transmission (data 2) (NDI = 0), where the Rx UE 1 incorrectly considers the data 2 as a retransmission of the data 1

FIG. 4

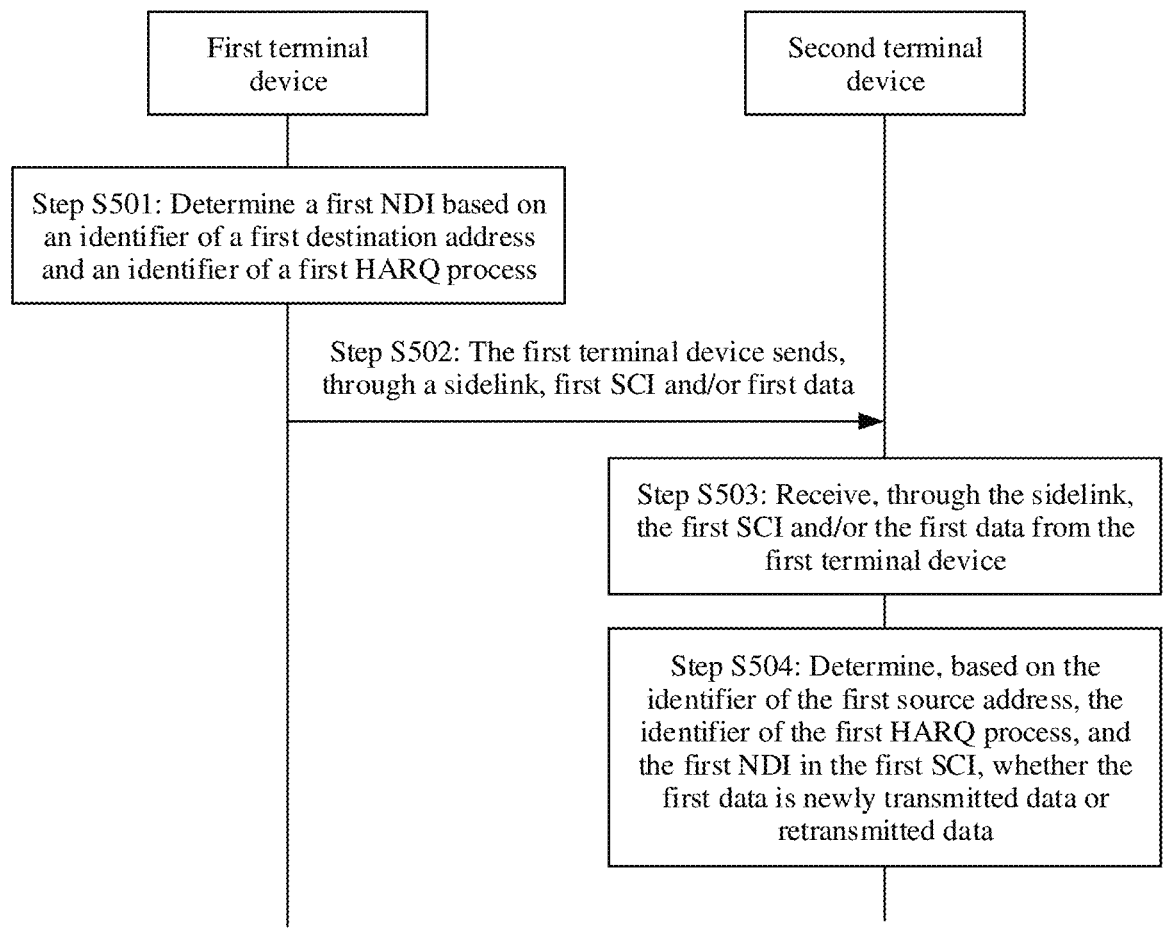

FIG. 5

Step 1: Tx UE 1 (source address 1) -> Rx UE 1 (destination address 1), HARQ process ID 1, new transmission (data 1) (NDI = 0); Rx UE 1 -> Tx UE 1, ACK;
step 2: Tx UE 1 (source address 1) -> Rx UE 2 (destination address 2), HARQ process ID 1, new transmission (data 2) (NDI = 1); Rx UE 2 -> Tx UE 1, ACK; and
step 3: Tx UE 1 (source address 1) -> Rx UE 1 (destination address 1), HARQ process ID 1, new transmission (data 3) (NDI = 1), where
    the Rx UE 1 can correctly determine that the data 3 is newly transmitted data

FIG. 6

Step 1: Tx UE 1 (source address 1) -> Rx UE 1 (destination address 1), HARQ process ID 1, new transmission (data 1) (NDI = 0); Rx UE 1 -> Tx UE 1, ACK;
step 2: Tx UE 2 (source address 2) -> Rx UE 1 (destination address 1), HARQ process ID 1, new transmission (data 2) (NDI = 1); Rx UE 1 -> Tx UE 2, ACK; and
step 3: Tx UE 1 (source address 1) -> Rx UE 1 (destination address 1), HARQ process ID 1, new transmission (data 3) (NDI = 1), where
    the Rx UE 1 can correctly determine that the data 3 is newly transmitted data

FIG. 7

Step 1: Tx UE 1 (source address 1) -> Rx UE 1 (destination address 1), HARQ process ID 1, new transmission (data 1) (NDI = 0); Rx UE 1 -> Tx UE 1, ACK;
step 2: Tx UE 1 (source address 2) -> Rx UE 2 (destination address 2), HARQ process ID 1, new transmission (data 2) (NDI = 1); Rx UE 2 -> Tx UE 1, ACK; and
step 3: Tx UE 1 (source address 1) -> Rx UE 1 (destination address 1), HARQ process ID 1, new transmission (data 3) (NDI = 1), where
    the Rx UE 1 can correctly determine that the data 3 is newly transmitted data

FIG. 8

Step 1: Unicast, Tx UE 1 (source address 1) -> Rx UE 1 (destination address 1), HARQ process ID 1, new transmission (data 1) (NDI = 0); Rx UE 1 -> Tx UE 1, ACK;
step 2: Multicast, Tx UE 1 (source address 1) -> Rx UE 1 (destination address 1), HARQ process ID 1, new transmission (data 2) (NDI = 1); Rx UE 2 -> Tx UE 1, ACK; and
step 3: Unicast, Tx UE 1 (source address 1) -> Rx UE 1 (destination address 1), HARQ process ID 1, new transmission (data 3) (NDI = 1), where
    the Rx UE 1 can correctly determine that the data 3 is newly transmitted data

FIG. 9

COMMUNICATION METHOD AND APPARATUS

CROSS-REFERENCE TO RELATED APPLICATIONS

This application is a continuation of International Application No. PCT/CN2019/109775, filed on Sep. 30, 2019, the disclosure of which is hereby incorporated by reference in its entirety.

TECHNICAL FIELD

This application relates to the field of wireless communication technologies, and in particular, to a communication method and apparatus.

BACKGROUND

Vehicle to everything (V2X) is a key technology of an intelligent transportation system, and is considered to be one of the fields that have the most potential in the industry and most clear market requirements in an internet of things system. The vehicle to everything usually refers to a communication network providing vehicle information by using a sensor, a vehicle-mounted terminal, or the like that is mounted on a vehicle, to implement vehicle to vehicle (V2V), vehicle to infrastructure (V2I), vehicle to network (V2N), and vehicle to pedestrian (V2P) communication.

The V2X features wide application, great industry potential, and great social benefits. The V2X is of great significance to promote innovative development of the automobile and information communication industry, build a new model and a new service for automobile and transportation services, promote innovation and application of technologies, such as unmanned driving, assisted driving, intelligent driving, connected driving, intelligent network driving, automated driving, and car sharing, and improve traffic efficiency and safety level.

Usually, in a V2X scenario, a communication link for performing direct communication between a terminal and another terminal may be referred to as a sidelink (sidelink, SL) or a sidelink.

For a new data indicator (NDI) in hybrid automatic repeat request (HARQ) information of the SL, currently there is no effective method on a transmit end for determining an NDI, and a receive end cannot correctly determine whether a transmission is a new transmission or a retransmission; and there is no effective method on the receive end for determining whether a transmission is a new transmission or a retransmission.

SUMMARY

Embodiments of this application provide a communication method and apparatus, to correctly set an NDI during sidelink transmission. This avoids misjudgment when a terminal device on a receive end determines, based on the NDI, whether data is newly transmitted or retransmitted.

According to a first aspect, an embodiment of this application provides a communication method. The method may be performed by a first terminal device or an apparatus (for example, a processor and/or a chip) in a first terminal device. The method includes: the first terminal device determines a first new data indicator NDI based on an identifier of a first destination address and an identifier of a first hybrid automatic repeat request HARQ process, where the first NDI is included in first sidelink control information SCI, and the first SCI is used to schedule first data; and sends, through a sidelink, the first SCI and/or the first data to a second terminal device.

According to the technical solutions provided in this application, the first terminal device may determine the NDI in the first SCI based on the identifier of the first destination address and the identifier of the first HARQ process. In this way, the NDI corresponding to the first data scheduled by the first SCI can be correctly set. This avoids misjudgment when the second terminal device on a receive end determines whether the first data is newly transmitted data or retransmitted data.

With reference to the first aspect, in a possible design of the first aspect, the first terminal device may determine the first NDI based on an identifier of a first source address, the identifier of the first destination address, and the identifier of the first HARQ process; or determine the first NDI based on a first communication type, an identifier of a first source address, the identifier of the first destination address, and the identifier of the first HARQ process. The first communication type includes any one or more of the following: unicast, multicast, and broadcast.

With reference to the first aspect, in a possible design of the first aspect, the first terminal device may determine the first NDI based on a second NDI and whether the first data is newly transmitted data or retransmitted data, where the second NDI is included in second SCI, the second SCI is used to schedule second data, and the second NDI is used to indicate whether the second data is newly transmitted data or retransmitted data. The second NDI is associated with the identifier of the first destination address and the identifier of the first HARQ process; the second NDI is associated with the identifier of the first source address, the identifier of the first destination address, and the identifier of the first HARQ process; or the second NDI is associated with the first communication type, the identifier of the first source address, the identifier of the first destination address, and the identifier of the first HARQ process.

With reference to the first aspect, in a possible design of the first aspect, a value of the first NDI may be obtained in any one or more of the following manners: If the first data is newly transmitted data, the first terminal device may invert a value of the second NDI, to obtain the value of the first NDI; or if the first data is retransmitted data, the first terminal device may determine that the value of the first NDI is the same as a value of the second NDI.

With reference to the first aspect, in a possible design of the first aspect, the first SCI includes any one or more of the following: information about the first source address, information about the first destination address, and information about the identifier of the first HARQ process.

According to a second aspect, an embodiment of this application provides a communication method. The method may be performed by a second terminal device or an apparatus (for example, a processor and/or a chip) in a second terminal device. The method includes: the second terminal device receives, through a sidelink, first sidelink control information SCI and/or first data from a first terminal device, where the first SCI is used to schedule the first data; and determines, based on an identifier of a first source address, an identifier of a first hybrid automatic repeat request HARQ process, and a first new data indicator NDI in the first SCI, whether the first data is newly transmitted data or retransmitted data.

According to the technical solutions provided in this application, the second terminal device may determine, based on the NDI in the first SCI, the identifier of the first source address, and the identifier of the first HARQ process, whether the first data scheduled by the first SCI is newly transmitted data or retransmitted data. This can effectively improve accuracy of data receiving.

With reference to the second aspect, in a possible design of the second aspect, the second terminal device may determine, based on the identifier of the first source address, an identifier of a first destination address, the identifier of the first HARQ process, and the first NDI in the first SCI, whether the first data is newly transmitted data or retransmitted data; or determine, based on a first communication type, the identifier of the first source address, an identifier of a first destination address, the identifier of the first HARQ process, and the first NDI in the first SCI, whether the first data is newly transmitted data or retransmitted data, where the first communication type includes any one or more of the following: unicast, multicast, and broadcast.

With reference to the second aspect, in a possible design of the second aspect, the second terminal device may determine, based on the first NDI and a second NDI associated with the identifier of the first source address and the identifier of the first HARQ process, whether the first data is newly transmitted data or retransmitted data, where the second NDI is included in second SCI, the second SCI is used to schedule second data, and the second NDI is used to indicate whether the second data is newly transmitted data or retransmitted data; determine, based on the first NDI and a second NDI associated with the identifier of the first source address, the identifier of the first destination address, and the identifier of the first HARQ process, whether the first data is newly transmitted data or retransmitted data; or determine, based on the first NDI and a second NDI associated with the first communication type, the identifier of the first source address, the identifier of the first destination address, and the identifier of the first HARQ process, whether the first data is newly transmitted data or retransmitted data.

With reference to the second aspect, in a possible design of the second aspect, if a value of the first NDI is different from a value of the second NDI, the second terminal device determines that the first data is newly transmitted data; or if a value of the first NDI is the same as a value of the second NDI, the second terminal device determines that the first data is retransmitted data.

With reference to the second aspect, in a possible design of the second aspect, the first SCI includes any one or more of the following: information about the first source address, information about the first destination address, and information about the identifier of the first HARQ process.

According to a third aspect, an embodiment of this application provides a communication apparatus. The apparatus has a function of implementing a function of the terminal device in any one of the first aspect or the possible designs of the first aspect, or a function of implementing a function of the terminal device in any one of the second aspect or the possible designs of the second aspect. The apparatus may be a terminal device, for example, a handheld terminal device, a vehicle-mounted terminal device, vehicle user equipment, or a road side unit, or may be an apparatus included in a terminal device, for example, a chip, or may be an apparatus including a terminal device. A function of the foregoing terminal device may be implemented by hardware, or may be implemented by hardware by executing corresponding software. The hardware or the software includes one or more modules corresponding to the foregoing function.

In a possible design, a structure of the apparatus includes a processing module and a transceiver module. The processing module is configured to support the apparatus in performing a corresponding function of the terminal device in any one of the first aspect or the possible designs of the first aspect, or performing a corresponding function of the terminal device in any one of the second aspect or the possible designs of the second aspect. The transceiver module is configured to support the apparatus in communicating with another communication device. For example, when the apparatus is a first terminal device, the apparatus may send, through a sidelink, first SCI and/or first data to a second terminal device. The communication apparatus may further include a storage module. The storage module is coupled to the processing module, and stores program instructions and data that are necessary for the apparatus. In an example, the processing module may be a processor, a communication module may be a transceiver, and the storage module may be a memory. The memory may be integrated with the processor, or may be disposed separately from the processor. This is not limited in this application.

In another possible design, a structure of the apparatus includes a processor, and may further include a memory. The processor is coupled to the memory, and may be configured to execute computer program instructions stored in the memory, to enable the apparatus to perform the method in any one of the first aspect or the possible designs of the first aspect or the method in any one of the second aspect or the possible designs of the second aspect. Optionally, the apparatus further includes a communication interface, and the processor is coupled to the communication interface. When the apparatus is a terminal device, the communication interface may be a transceiver or an input/output interface. When the apparatus is a chip included in a terminal device, the communication interface may be an input/output interface of the chip. Optionally, the transceiver may be a transceiver circuit, and the input/output interface may be an input/output circuit.

According to a fourth aspect, an embodiment of this application provides a chip system, including a processor. The processor is coupled to a memory, the memory is configured to store a program or instructions, and when the program or the instructions is/are executed by the processor, the chip system is enabled to implement the method in any one of the first aspect or the possible designs of the first aspect, or implement the method in any one of the second aspect or the possible designs of the second aspect.

Optionally, the chip system further includes an interface circuit, and the interface circuit is configured to receive code instructions and transmit the code instructions to the processor.

Optionally, there may be one or more processors in the chip system, and the processor may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a fifth aspect, an embodiment of this application provides a readable storage medium. The readable storage medium stores a computer program or instructions, and when the computer program or the instructions is/are executed, a computer is enabled to perform the method in any one of the first aspect or the possible designs of the first aspect, or perform the method in any one of the second aspect or the possible designs of the second aspect.

According to a sixth aspect, an embodiment of this application provides a computer program product. When a computer reads and executes the computer program product, the computer is enabled to perform the method in any one of the first aspect or the possible designs of the first aspect, or perform the method in any one of the second aspect or the possible designs of the second aspect.

According to a seventh aspect, an embodiment of this application provides a communication system. The communication system includes a network device and at least one terminal device.

BRIEF DESCRIPTION OF THE DRAWINGS

FIG. 3 is a schematic diagram of an NDI when a same transmit terminal device sends data to a plurality of receive terminal devices by using a same HARQ process according to an embodiment of this application;

FIG. 4 is a schematic diagram of an NDI when different transmit terminal devices send data to a same receive terminal device by using an identifier of a same HARQ process according to an embodiment of this application;

FIG. 5 is a schematic flowchart of a communication method according to an embodiment of this application;

FIG. 6 is a schematic diagram of an example corresponding to a technical solution in a first possible design according to an embodiment of this application;

FIG. 7 is a schematic diagram of another example corresponding to a technical solution in a first possible design according to an embodiment of this application;

FIG. 8 is a schematic diagram of an example corresponding to a technical solution in a second possible design according to an embodiment of this application;

FIG. 9 is a schematic diagram of an example corresponding to a technical solution in a third possible design according to an embodiment of this application;

DETAILED DESCRIPTION OF ILLUSTRATIVE EMBODIMENTS

To make objectives, technical solutions, and advantages of embodiments of this application clearer, the following further describes embodiments of this application in detail with reference to the accompanying drawings.

The technical solutions of embodiments of this application may be used in various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WIMAX) communication system, and a 5th generation (5G) system or a new radio (NR) system, or is used in a future communication system or another similar communication system.

The technical solutions in embodiments of this application may be used in technical fields such as unmanned driving, assisted driving (ADAS), intelligent driving, connected driving, intelligent network driving, car sharing, a smart/intelligent car, a digital car, an unmanned car (unmanned car/driverless car/pilotless car/automobile), the Internet of vehicles (IoV), a self-driving car (self-driving car/autonomous car), a cooperative vehicle infrastructure (CVIS), an intelligent transportation system (ITS), and vehicular communication.

In addition, the technical solutions provided in embodiments of this application may be applied to a cellular link, or may be applied to a link between devices, for example, a device to device (D2D) link. The D2D link or a V2X link may also be referred to as a sidelink, a secondary link, a sidelink, or the like. In embodiments of this application, the foregoing terms all refer to links established between devices of a same type, and have a same meaning. The link established between devices of a same type may be a link between terminal devices, a link between base stations, a link between relay nodes, or the like. This is not limited in embodiments of this application.

Figure 1:
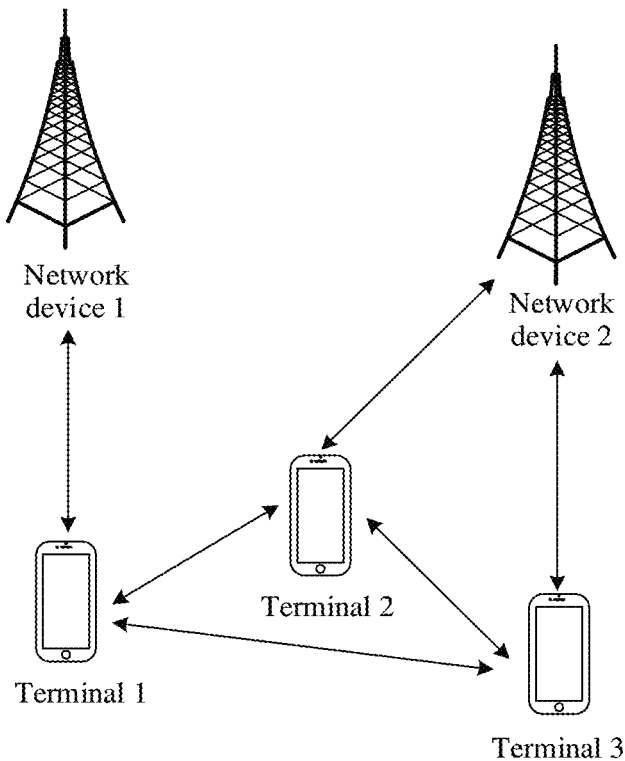
FIG. 1 is a schematic diagram of a network architecture of a communication system to which an embodiment of this application is applicable.

FIG. 1 is a schematic diagram of a network architecture of a communication system to which an embodiment of this application is applicable. Network elements in this application include a network device and a terminal in a communication system. Refer to FIG. 1. A method provided in an embodiment of this application mainly relates to communication between terminals, and communication between a terminal and a network device. The network device may communicate with at least one terminal device on an uplink (UL) and a downlink (DL), and a communication interface between the network device and the terminal device is a Uu interface. The terminal device may communicate, through a sidelink (SL), with another terminal device on. The sidelink may also be understood as a direct communication link between terminal devices.

Sidelink-based communication may be performed on at least one of the following channels: a physical sidelink shared channel (PSSCH) used to carry sidelink data information, and a physical sidelink control channel (PSCCH) used to carry sidelink control information (SCI).

The network device in FIG. 1 may be an access network device, for example, a base station. The access network device corresponds to different devices in different systems. For example, the access network device may correspond to an eNB in a 4th generation mobile communication technology (4G) system, or correspond to a 5G access network device, for example, a gNB, in a 5G system. The technical solutions provided in embodiments of this application may also be applied to a future mobile communication system, for example, a 6G or 7G communication system. Therefore, the network device in FIG. 1 may alternatively correspond to an access network device in the future mobile communication system.

It should be understood that there may be a plurality of network devices in the communication system, and each network device may provide a service for a plurality of terminal devices. A quantity of network devices and a quantity of terminal devices in the communication system are not limited in embodiments of this application. The network device in FIG. 1 and each of some or all of the plurality of terminal devices may implement the technical solutions provided in embodiments of this application. In addition, the terminal device in FIG. 1 is described by using a vehicle-mounted terminal device or a vehicle as an example. It should be understood that the terminal device in this embodiment of this application is not limited thereto. The terminal device may alternatively be a mobile phone, a vehicle, a vehicle-mounted device, a vehicle-mounted module, a road side unit, a pedestrian handheld device, or a massive machine type of communication (mMTC) terminal device such as a smart water meter and an electricity meter in the Internet of things.

The following describes some terms in embodiments of this application, to help a person skilled in the art have a better understanding.

(1) Terminal device: The terminal device may also be referred to as user equipment (user equipment, UE), a mobile station (MS), a mobile terminal (MT), or the like, and is a device that provides voice and/or data connectivity for a user. The terminal device may communicate with a core network through a radio access network (RAN), and exchange voice and/or data with the RAN. For example, the terminal device may be a handheld device, a vehicle-mounted device, vehicle user equipment, or the like that has a wireless connection function. Currently, for example, the terminal device is a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

As an example rather than a limitation, the terminal device in embodiments of this application may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

The terminal device in embodiments of this application may alternatively be a built-in vehicle-mounted module, vehicle-mounted module, vehicle-mounted component, vehicle-mounted chip, or vehicle-mounted unit with which a vehicle is equipped and that is used as one or more components or units. The vehicle may use the built-in vehicle-mounted module, vehicle-mounted module, vehicle-mounted component, vehicle-mounted chip, or vehicle-mounted unit to implement the method in this application.

(2) Network device: The network device is a device that is in a network and that is configured to connect a terminal device to a wireless network. The network device may be a node in a radio access network, and may also be referred to as a base station, or may be referred to as a radio access network (RAN) node (or device). The network device may be configured to: mutually convert a received over-the-air frame and an Internet protocol (IP) packet, and serve as a router between the terminal device and a remaining part of the access network. The remaining part of the access network may include an IP network. The network device may further coordinate attribute management of the air interface. For example, the network device may include a long term evolution (LTE) system or an evolved NodeB (NodeB, eNB, or e-NodeB, evolutional NodeB) in an evolved LTE system (LTE-A), for example, a conventional macro base station eNB and a micro base station eNB in a heterogeneous network scenario; or may include a next generation NodeB (gNB) in a 5th generation (5G) new radio (NR) system; or may further include a transmission reception point (TRP), a home base station (for example, a home evolved NodeB, or a home NodeB, HNB), a baseband unit (BBU), a baseband pool BBU pool, a Wi-Fi access point (AP), or the like; or may further include a centralized unit (CU) and a distributed unit (DU) in a cloud access network (CloudRAN) system. This is not limited in embodiments of this application. For another example, a network device in a V2X technology is a road side unit (RSU). The RSU may be a fixed infrastructure entity supporting a V2X application, and may exchange a message with another entity supporting the V2X application.

(3) Uplink (UL) and Downlink (DL)

A wireless communication link on which a terminal device sends data (namely, uplink data) to a network device may be referred to as a UL. A wireless communication link on which a network device sends data (namely, downlink data) to a terminal may be referred to as a DL. A UL interface and a DL interface may be collectively referred to as a Uu interface. Therefore, the UL and the DL may be collectively referred to as a Uu interface link.

A communication link for direct communication between the terminal device and the terminal device may be referred to as an SL. The SL may also be referred to as a sidelink. Data transmitted between terminals may be referred to as SL data.

For example, data in embodiments of this application may be understood as a transport block (TB) or a medium access control (MAC) protocol data unit (PDU). Data may also be referred to as a data packet or a packet.

(4) Resource Allocation Mode on a Sidelink

An SL transmission resource used by a transmit terminal device in two terminal devices may be determined in any one of Manner A and Manner B.

Manner A: Scheduling by a Network Device

A mode in which the network device schedules a sidelink transmission resource may include a mode 1 (mode 1) resource configuration mode (a name in NR) or a mode 3 (mode 3) resource configuration mode (a name in LTE).

The sidelink transmission resource scheduled by the network device includes the following two types.

Type 1: A Configured Grant (CG) Resource

In this case, the network device does not need to separately allocate a resource to the transmit terminal during each data transmission. After the network device allocates a resource to the transmit terminal for one time, the transmit terminal may use the allocated resource in a future period of time. A feature of the foregoing allocation is "a resource allocated for one time is used for a plurality of times". Specifically, the network device may configure a time domain resource that appears periodically for the transmit terminal.

The CG resource may include a type 1 CG (SL configured grant type-1) resource, a type 2 CG (SL configured grant type-2) resource, a grant-free (SL grant-free) resource, and a semi-persistent scheduling (SL Semi-Persistent Scheduling, SL SPS) resource. The type 1 CG resource may be an SL transmission resource that is directly configured by the network device for the transmit terminal by using radio resource control (RRC) signaling. The transmit terminal may directly use the CG resource to perform a data transmission without additionally activating the resource. The type 2 CG resource may be an SL transmission resource whose period is defined by the network device by using RRC signaling and that is activated by using downlink control information (DCI) of a physical downlink control channel (PDCCH). The transmit terminal may use the SL transmission resource to perform a data transmission only after activating the resource. The grant-free resource may be an SL transmission resource that is directly configured by the network device for the transmit terminal by using RRC signaling. The transmit terminal may directly use the SL transmission resource to perform a data transmission without additionally activating the resource. The semi-persistent scheduling resource may be an SL transmission resource whose period is defined by the network device by using RRC signaling and that is activated by using DCI of a PDCCH. The transmit terminal may use the SL transmission resource to perform a data transmission only after activating the resource.

Currently, for the uplink, one carrier only supports one CG resource. For the SL, one carrier may support a plurality of CG resources, and different CG resources may correspond to different indexes. For example, CG resources corresponding to indexes 1, 2, and 3 may be respectively denoted as CG 1, CG 2, and CG 3.

Type 2: Dynamic Grant (DG) Resource

The network device needs to separately allocate a resource to the transmit terminal during each data transmission. A feature of the foregoing allocation is "a resource allocated for one time is used for one time". For example, the network device may dynamically allocate an SL transmission resource to the transmit terminal by using DCI. The DCI may be carried on a PDCCH.

A major difference between DG and CG lies in resource allocation flexibility and resource allocation overheads. For DG, the network device needs to allocate a grant resource to the transmit terminal during each data transmission. Resource allocation is flexible, but resource allocation overheads are large. For CG, the network device allocates a grant resource for one time, and the transmit terminal may use the resource for a plurality of times. Resource allocation overheads are small, but the allocated resource is not changed or adjusted during a long period of time, and resource allocation is not flexible. For DG, a resource is usually allocated by using a physical channel (for example, a PDCCH), and resource allocation is quick. For CG, a resource is usually configured by using higher-layer signaling (for example, RRC signaling) or higher-layer signaling (for example, RRC signaling) and a physical channel (for example, a PDCCH), and resource allocation is slow.

Manner B: Determining by the Transmit Terminal Device

A mode in which the transmit terminal determines the SL transmission resource may include a mode 2 (mode 2) resource configuration mode (a name in NR) or a mode 4 resource configuration mode (a name in LTE).

In Manner B, when the transmit terminal is within communication coverage of the network device, the network device may configure an SL resource pool for the transmit terminal by using a system information block (system information block, SIB) or dedicated RRC signaling, and the transmit terminal may obtain an SL transmission resource from the SL resource pool, to send a control signal and/or a data signal to a receive terminal. When the transmit terminal is not within communication coverage of the network device, the transmit terminal may obtain an SL transmission resource from an SL resource pool preconfigured by the transmit terminal, to send a control signal and/or a data signal to a receive terminal.

When obtaining the SL transmission resource from the SL resource pool, the transmit terminal may sense or contend for the SL transmission resource. Specifically, the transmit terminal contends with another terminal for an appropriate SL transmission resource in the SL resource pool, to send the control signal and/or the data signal. A higher priority of a to-be-transmitted V2X service or to-be-transmitted data of the transmit terminal indicates a greater opportunity of contending for an appropriate SL transmission resource in the SL resource pool.

In LTE V2X, a mode 3 and a mode 4 cannot coexist. In NR V2X, a mode 1 and a mode 2 can coexist.

Sidelink resources may be classified into a plurality of types, specifically including the following plurality of types:

- A sidelink resource for the mode 1 is a sidelink transmission resource scheduled by the network device, and may include a resource configured in the mode 1 resource configuration mode, or a resource configured in the mode 3 resource configuration mode. The resource configured in the mode 1 resource configuration mode, or the resource configured in the mode 3 resource configuration mode may include a sidelink configured grant resource and/or a sidelink dynamic grant resource.
- A sidelink resource for the mode 2 is a sidelink transmission resource that needs to be selected, contended for, or sensed by the terminal, and may include a resource configured in the mode 2 resource configuration mode, or a resource configured in the mode 4 resource configuration mode.
- A sidelink type 1 configured grant resource is a configured grant resource that can be directly used without being activated, and may include the type 1 CG resource and/or the grant-free resource.
- A sidelink type 2 configured grant resource is a configured grant resource that can be used by the terminal only after being activated, and may include the type 2 CG resource and/or the semi-persistent scheduling resource.
- A sidelink resource is the sidelink resource for the mode 1 and/or the sidelink resource for the mode 2.
- A sidelink configured grant resource is the sidelink type 1 configured grant resource and/or the sidelink type 2 configured grant resource.

A sidelink dynamic grant resource is a sidelink transmission resource dynamically allocated by the network device to the terminal by using DCI.

A sidelink configured grant resource set includes configured grant resources corresponding to one or more configured grant resource indexes, for example, a resource set including CG 1, CG 2, and CG 3.

It should be noted that different configured grant resource sets are different types of resources. For example, a configured grant resource set 1 is resources of one type, and a configured grant resource set 2 is resources of another type.

(5) HARQ

A HARQ is a technology that combines forward error correction (FEC) (or forward error correction code) with an automatic repeat request (ARQ) method.

The FEC means that data sent by a transmit end includes forward error correction code or redundant information. After receiving the data, a receive end finds an error through a check (for example, a cyclic redundancy check (CRC)), and then can correct the error by using the forward error correction code or the redundant information. In this way, the transmit end can reduce a quantity of retransmissions (namely, retransmitting the data).

The ARQ means that the receive end determines correctness of the received data through a check (for example, a CRC check). If the data is correctly received, the receive end sends acknowledgment (ACK) to notify the transmit end; otherwise, the receive end sends negative acknowledgment (NACK) to notify the transmit end. When receiving the NACK, the transmit end retransmits the data to the receive end. The ACK and the NACK are HARQ feedback.

LTE V2X supports only a broadcast service, but does not support SL HARQ feedback. NR V2X supports unicast, multicast, and broadcast services and SL HARQ feedback.

The following specifically describes HARQ-related content in a part (a) and a part (b).

(a) HARQ Process

Figure 2:
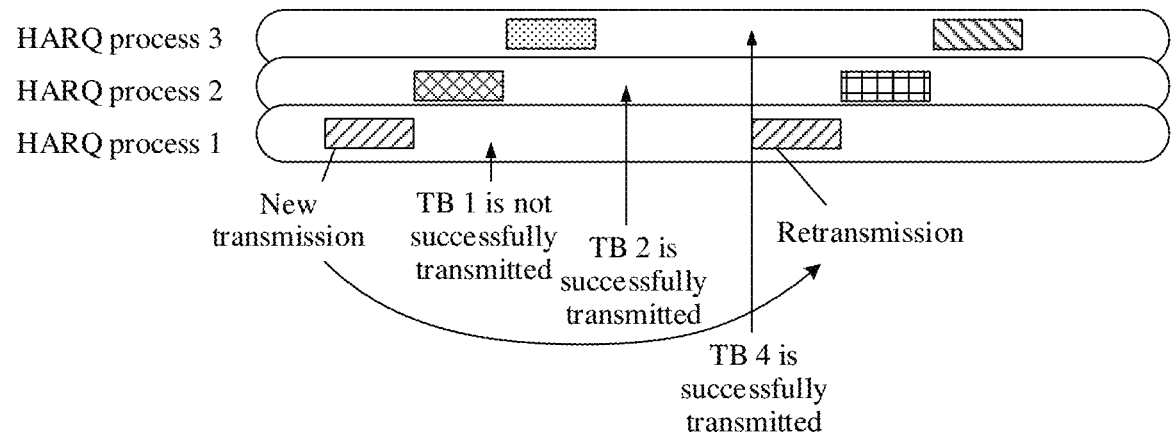
FIG. 2 is a schematic diagram of data sending by using a plurality of parallel HARQ processes according to an embodiment of this application.

A stop-and-wait protocol (stop-and-wait protocol) is used in the HARQ process to send data. In the stop-and-wait protocol, after sending a transport block (transport block, TB), the transmit end stops and waits for acknowledgment information. The receive end feeds back ACK or NACK for the TB. However, the transmit end stops and waits for acknowledgment after each transmission, and low throughput is caused. Therefore, a plurality of parallel HARQ processes may be used. When one HARQ process waits for acknowledgment, the transmit end may continue to send data by using another HARQ process. For example, as shown in FIG. 2, a plurality of parallel HARQ processes may be used. When one HARQ process waits for acknowledgment information, the transmit terminal may continue to send data by using another HARQ process.

(b) Processing Mechanism of the Receive End for Newly Transmitted Data and Retransmitted Data Each HARQ process has a corresponding buffer (for example, a HARQ buffer or a soft buffer) at the receive end, to combine the received data with data currently in the soft buffer and decode combined data.

After receiving newly transmitted data sent by the transmit end by using a HARQ process, the receive end may place the received newly transmitted data into a buffer (for example, a HARQ buffer or a soft buffer) corresponding to the HARQ process, and perform decoding. If decoding fails, when receiving retransmitted data of the newly transmitted data again, the receive end may combine the received retransmitted data with the newly transmitted data previously stored in the buffer, place combined data into the buffer, and perform decoding. The foregoing manner may be referred to as combining the received data with data currently in the soft buffer and decoding combined data. Compared with separate decoding (that is, data during each transmission is separately decoded, and is not combined with previous data for decoding), the manner improves a success rate of decoding. Similarly, if decoding still fails, the foregoing process may continue to be repeated. Newly received retransmitted data is combined with data in the buffer, and decoding is performed again.

(6) The terms "system" and "network" in embodiments of this application may be used interchangeably. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of description such as "at least one type" is similar. The term "and/or" describes an association relationship for describing associated objects and represents that three relationships may exist. For example, A and/or B may represent the following three cases: Only A exists, both A and B exist, and only B exists. In addition, the character "/", unless otherwise specified, usually indicates an "or" relationship between the associated objects.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, description of "first" and "second" does not necessarily indicate that objects are different.

In NR V2X, a transmit terminal device may add a new data indicator (new data indicator, NDI) to SCI, and the NDI is used to indicate whether a corresponding transmission is a new transmission or a retransmission. A receive terminal device determines, based on the NDI, whether data scheduled by the SCI is newly transmitted or retransmitted.

In the existing technology, a transmit terminal device maintains NDI information in SCI by using an identifier of a hybrid automatic repeat request (hybrid automatic repeat request, HARQ) process. For a HARQ process, if a data transmission currently performed by using the HARQ process is a new transmission, an NDI in SCI corresponding to the current data transmission needs to be inverted based on an NDI in SCI corresponding to a previous data transmission performed by using the HARQ process. If a data transmission currently performed by using the HARQ process is a retransmission, an NDI in SCI corresponding to the current data transmission needs to be the same as an NDI in SCI corresponding to a previous data transmission performed by using the HARQ process.

Correspondingly, the receive terminal device determines, based on whether the NDI in the SCI corresponding to the current data transmission is inverted relative to the NDI that is in the SCI corresponding to the previous data transmission and that has a same identifier of the HARQ process, whether the current data transmission is a new transmission or a retransmission.

Because a same transmit terminal device may send data to a plurality of receive terminal devices by using a same HARQ process, if the transmit terminal device maintains an NDI only based on a same HARQ process ID, the receive UE may not correctly determine whether a corresponding transmission is a new transmission or a retransmission.

For example, as shown in FIG. 3, step 1: Transmit UE sends data (for example, data 1) to receive UE 1 by using a HARQ process ID (HARQ process ID) 1, where the data 1 is newly transmitted data, and an NDI is set to 0. Then, the transmit UE receives ACK feedback from the receive UE 1 for the transmission. The transmit UE considers that the transmission in step 1 succeeds. Step 2: The transmit UE sends data (for example, data 2) to receive UE 2 by using the HARQ process ID (HARQ process ID) 1, where the data 2 is newly transmitted data. If an NDI is maintained based on the same HARQ process ID, the data 2 corresponding to the HARQ process ID 1 in step 2 is newly transmitted data, and the HARQ process ID in step 2 is the same as the HARQ process ID used in step 1. Therefore, compared with the NDI in step 1, the NDI in step 2 should be inverted, that is, the NDI in step 2 should be set to 1. Then, the transmit UE receives ACK feedback from the receive UE 2 for the transmission. Step 3: The transmit UE sends data (for example, data 3) to the receive UE 1 by using the HARQ process ID (HARQ process ID) 1, where the data 3 is newly transmitted data. In this case, an NDI in step 3 should be set to 0 by using the same method of setting the NDI in step 2.

The receive UE 1 receives two transmissions associated with the HARQ process ID 1, namely, transmissions in step 1 and step 3 respectively. If the receive UE 1 determines, based on whether the NDI corresponding to the same HARQ process ID is inverted, that the current data transmission is a new transmission or a retransmission, and the NDI in step 3 is not inverted compared with the NDI in step 1, the receive UE 1 incorrectly determines that the transmission in step 3 is a retransmission of the transmission in step 1, considers the data 3 in step 3 as retransmitted data of the data 1 in step 1, and combines the data 3 with the data 1 received before, and performs decoding. This causes a decoding error.

Similarly, different transmit terminal devices may alternatively send data to a same receive terminal device by using a same identifier of a HARQ process. If the receive terminal device determines, only based on whether an NDI corresponding to a same HARQ process ID is inverted, whether the current data transmission is a new transmission or a retransmission, a determining error is caused, and correct data receiving is further affected.

For example, as shown in FIG. 4, step 1: Transmit UE 1 sends data (for example, data 1) to receive UE by using a HARQ process ID (HARQ process ID) 1, where the data 1 is newly transmitted data, and an NDI is set to 0. Step 2: Transmit UE 2 sends data (for example, data 2) to the receive UE by using the HARQ process ID (HARQ process ID) 1, where the data 2 is newly transmitted data, and an NDI is set to 0.

The receive UE receives two transmissions associated with the HARQ process ID 1, namely, transmissions in step 1 and step 2 respectively. If the receive UE determines, based on whether the NDI corresponding to the same HARQ process ID is inverted, that the current data transmission is a new transmission or a retransmission, and the NDI in step 2 is not inverted compared with the NDI in step 1, the receive UE incorrectly determines that the transmission in step 2 is a retransmission of the transmission in step 1, considers the data 2 in step 2 as retransmitted data of the data 1 in step 1, and combines the data 2 with the data 1 received before, and performs decoding. This causes a decoding error.

To resolve misjudgment of receive UE, this application provides a new method in which transmit UE maintains an NDI, and a method in which receive UE determines whether a transmission is a new transmission or a retransmission. Specific content is described in the following embodiments.

FIG. 5 is a schematic flowchart of a communication method according to an embodiment of this application. The method specifically includes step S501 to step S504.

Step S501: A first terminal device determines or maintains a first new data indicator NDI based on an identifier of a first destination address and an identifier of a first hybrid automatic repeat request HARQ process.

In this embodiment of this application, first SCI is used to schedule first data. The first NDI is included in the first SCI, and is used to indicate whether the first data is newly transmitted data or retransmitted data. It may also be understood that the first NDI is used to indicate whether the data scheduled by the first SCI is newly transmitted or retransmitted. Optionally, the first data may be transmitted on first sidelink grant, and it may further be understood that the first NDI is used to indicate whether a transmission on the first sidelink grant is a new transmission or a retransmission. It may be understood that when the first data is newly transmitted data, it may indicate that the first sidelink grant is used for a new transmission. When the first data is retransmitted data, it may indicate that the first sidelink grant is used for a retransmission.

A first source address mentioned in this embodiment of this application is a source address of the first data, and the first source address may correspond to the first terminal device. The first destination address is a destination address of the first data, and the first destination address may correspond to a second terminal device or a service.

For example, an identifier (for example, a layer-1 source ID) of the first source address may be used to identify a transmit end used for unicast, multicast, or broadcast communication. The identifier (for example, a layer-1 destination ID) of the first destination address may be used to identify a receive end used for unicast or multicast communication, or identify a broadcast service. A pair of the identifier (for example, the layer-1 source ID) of the first source address and the identifier (for example, the layer-1 destination ID) of the first destination address may be used to identify a unicast connection or multicast communication. The identifier (for example, a layer-1 destination ID) of the first destination address may be used to identify a broadcast communication service.

It should be understood that in this embodiment of this application, the first terminal device may correspond to one or more source addresses, and the second terminal device may correspond to one or more destination addresses. For example, as a data transmit end, the first terminal device may simultaneously communicate with a plurality of receive terminal devices, that is, the first terminal device may simultaneously perform unicast communication, multicast communication, or broadcast communication with one or more second terminal devices. Therefore, the first terminal device may correspond to one or more source addresses, separately used to communicate with different receive terminal devices. As a data receive end, the second terminal device may simultaneously communicate with a plurality of transmit terminal devices, that is, the second terminal device may simultaneously perform unicast communication, multicast communication, or broadcast communication with one or more transmit terminal devices. Therefore, the second terminal device may correspond to one or more destination addresses, separately used to communicate with different receive terminal devices.

It should further be understood that when the first terminal device serves as a data transmit end and simultaneously performs communication of different communication types (for example, unicast communication and multicast communication), different communication types may correspond to a same source address or different source addresses. This is not limited in this application. Similarly, when the second terminal device serves as a data receive end and simultaneously performs communication of different communication types (for example, unicast communication and multicast communication), different communication types may correspond to a same destination address or different destination addresses. This is not limited in this application.

The first HARQ process mentioned in this embodiment of this application is a HARQ process used to send the first data.

In a first possible design, if the first terminal device only corresponds to one source address, the first terminal device may determine the first NDI based on the identifier of the first destination address and the identifier of the first HARQ process.

Specifically, the first terminal device may determine a second NDI associated with the identifier of the first destination address and the identifier of the first HARQ process. The second NDI is included in second SCI used to schedule second data, and is used to indicate whether the second data is newly transmitted data or retransmitted data. It may also be understood that the second NDI is used to indicate whether a data scheduled by the second SCI is a new transmission or a retransmission. Optionally, the second data may be transmitted on second sidelink grant, and it may further be understood that the second NDI is used to indicate whether a transmission on the second sidelink grant is a new transmission or a retransmission.

It should be noted that in this embodiment of this application, the second NDI associated with the identifier of the first destination address and the identifier of the first HARQ process may be an NDI before the first NDI, a previous NDI before the first NDI, or an NDI closest to the first NDI. In addition, the first NDI and the second NDI are associated with the same identifier of the first destination address and identifier of the first HARQ process. In other words, the second data and the first data are sent by using the same HARQ process, and the second data has the same destination address as the first data.

Optionally, the second SCI may be SCI sent by the first terminal device to the second terminal device before the first terminal device sends the first SCI, or the second data is data scheduled by the first terminal device before the first terminal device schedules the first data.

The data scheduled by the second SCI may further be a recent data transmission that is sent by using the same HARQ process as a data scheduled by the first SCI and that has the same destination address as the first data scheduled by the first SCI. In other words, the second NDI is an NDI, in the SCI, that is recently, previously, or last scheduled by the first terminal device, where the scheduled data and the first data are sent by using the same HARQ process, and the SCI corresponds to the data transmission having the same destination address as the first data.

Alternatively, in this embodiment of this application, the second NDI associated with the identifier of the first destination address and the identifier of the first HARQ process may be an NDI last set by the first terminal device, where a HARQ process (for example, a HARQ process ID) and a destination address associated with the NDI last set are the same as the HARQ process (for example, a HARQ process ID) and the destination address associated with the first NDI, namely, the identifier of the first HARQ process and the identifier of the first destination address.

Further, the first terminal device may determine the first NDI based on the determined second NDI and whether the first data is newly transmitted data or retransmitted data.

In a possible implementation, if the first data is newly transmitted data, the first terminal device inverts a value of the second NDI, to obtain a value of the first NDI. Alternatively, if the first data is retransmitted data, the first terminal device may determine a value of the second NDI as a value of the first NDI. In this embodiment of this application, the NDI may have two values: a first value and a second value. In this way, inverting a value of an NDI specifically means that if a value of an NDI is the first value, the value of the NDI is inverted, to obtain the second value; or if a value of an NDI is the second value, the value of the NDI is inverted, to obtain the first value. It should be understood that in this embodiment of this application, inverting the value of the second NDI does not change the value of the second NDI, and is an operation in which the value of the second NDI is used in an inverting operation, where a result of the operation is used as the value of the first NDI. For example, the first value may be 0, and the second value may be 1. Alternatively, the first value may be 0, and the second value may be a value other than 0.

In this way, if the first data is newly transmitted data, the first terminal device may determine that the value of the first NDI is different from the value of the second NDI, that is, determine, as the value of the first NDI, a value of an NDI that is in the two possible values of the NDI and that is different from the value of the second NDI. Alternatively, if the first data is retransmitted data, the first terminal device may determine that the value of the NDI is the same as the value of the second NDI, that is, determine the value of the second NDI as the value of the first NDI.

In another possible implementation, if the first data is newly transmitted data, the first terminal device may set the first NDI to a first value; or if the first data is retransmitted data, the first terminal device may set the first NDI to a second value. Alternatively, if the first data is newly transmitted data, the first terminal device may set the first NDI to the second value; or if the first data is retransmitted data, the first terminal device may set the first NDI to the first value. For example, the first value may be 0, and the second value may be 1. Alternatively, the first value may be 0, and the second value may be a value other than 0.

In a second possible design, the first terminal device determines or maintains the first NDI based on the identifier of the first source address, the identifier of the first destination address, and the identifier of the first HARQ process.

Specifically, the first terminal device may determine a second NDI associated with the identifier of the first source address, the identifier of the first destination address, and the identifier of the first HARQ process. The second NDI is included in second SCI used to schedule second data, and is used to indicate whether the second data is newly transmitted data or retransmitted data. It may also be understood that the second NDI is used to indicate whether a data scheduled by the second SCI is a new transmission or a retransmission. Optionally, the second data may be transmitted on second sidelink grant, and it may further be understood that the second NDI is used to indicate whether a transmission on the second sidelink grant is a new transmission or a retransmission.

It should be noted that in this embodiment of this application, the second NDI associated with the identifier of the first source address, the identifier of the first destination address, and the identifier of the first HARQ process may be an NDI before the first NDI, a previous NDI before the first NDI, or an NDI closest to the first NDI. In addition, the first NDI and the second NDI are associated with the same identifier of the first source address, identifier of the first destination address, and identifier of the first HARQ process. In other words, the second data and the first data are sent by using the same HARQ process, and the second data has the same source address and destination address as the first data.

Optionally, the second SCI may be SCI sent by the first terminal device to the second terminal device before the first terminal device sends the first SCI, or the second data is data scheduled by the first terminal device before the first terminal device schedules the first data.

The data scheduled by the second SCI may further be a recent data transmission that is sent by using the same HARQ process as a data scheduled by the first SCI and that has the same source address and destination address as the first data scheduled by the first SCI. In other words, the second NDI is an NDI, in the SCI, that is recently, previously, or last scheduled by the first terminal device, where the scheduled data and the first data are sent by using the same HARQ process, and the SCI corresponds to the data transmission having the same source address and destination address as the first data.

Alternatively, in this embodiment of this application, the second NDI associated with the identifier of the first source address, the identifier of the first destination address, and the identifier of the first HARQ process may be an NDI last set by the first terminal device, where a HARQ process (for example, a HARQ process ID), a source address, and a destination address associated with the NDI last set are the same as the HARQ process (for example, a HARQ process ID), the source address, and the destination address associated with the first NDI, namely, the identifier of the first HARQ process, the identifier of the first source address, and the identifier of the first destination address.

Further, the first terminal device may determine the first NDI based on the determined second NDI and whether the first data is newly transmitted data or retransmitted data.

In a possible implementation, if the first data is newly transmitted data, the first terminal device inverts a value of the second NDI, to obtain a value of the first NDI. Alternatively, if the first data is retransmitted data, the first terminal device may determine a value of the second NDI as a value of the first NDI.

In this embodiment of this application, the NDI may have two values: a first value and a second value. In this way, inverting a value of an NDI specifically means that if a value of an NDI is the first value, the value of the NDI is inverted, to obtain the second value; or if a value of an NDI is the second value, the value of the NDI is inverted, to obtain the first value. It should be understood that in this embodiment of this application, inverting the value of the second NDI does not change the value of the second NDI, and is an operation in which the value of the second NDI is used in an inverting operation, where a result of the operation is used as the value of the first NDI. For example, the first value may be 0, and the second value may be 1. Alternatively, the first value may be 0, and the second value may be a value other than 0.

In another possible implementation, if the first data is newly transmitted data, the first terminal device may set the first NDI to a first value; or if the first data is retransmitted data, the first terminal device may set the first NDI to a second value. Alternatively, if the first data is newly transmitted data, the first terminal device may set the first NDI to the second value; or if the first data is retransmitted data, the first terminal device may set the first NDI to the first value.

It should be understood that the technical solution provided in the second possible design may be applied to a scenario in which the first terminal device corresponds to one or more source addresses, or a scenario in which the second terminal device corresponds to one or more destination addresses. If the first terminal device corresponds to only one source address, a factor of the source address in the second possible design is omitted, to obtain the technical solution provided in the first possible design.

In a third possible design, the first terminal device determines or maintains the first NDI based on a first communication type, the identifier of the first source address, the identifier of the first destination address, and the identifier of the first HARQ process. The first communication type may be any one or more of the following: unicast, multicast, and broadcast. The communication type may also be referred to as a cast type, a sending manner, a transmission manner, or the like, or may have another name. This is not limited in this application.

Specifically, the first terminal device may determine a second NDI associated with the first communication type, the identifier of the first source address, the identifier of the first destination address, and the identifier of the first HARQ process. The second NDI is included in second SCI used to schedule second data, and is used to indicate whether the second data is newly transmitted data or retransmitted data. It may also be understood that the second NDI is used to indicate whether a data scheduled by the second SCI is a new transmission or a retransmission. Optionally, the second data may be transmitted on second sidelink grant, and it may further be understood that the second NDI is used to indicate whether a transmission on the second sidelink grant is a new transmission or a retransmission.

It should be noted that in this embodiment of this application, the second NDI associated with the first communication type, the identifier of the first source address, the identifier of the first destination address, and the identifier of the first HARQ process may be an NDI in the second SCI, where the scheduled data and the first data are sent by using the same HARQ process, and the second SCI corresponds to the data having the same communication type, source address, and destination address as the first data. In other words, the second data and the first data are sent by using the same HARQ process, and the second data has the same communication type, source address, and destination address as the first data. That the second data has the same communication type as the first data may also be understood as that the first terminal device sends the first data and the second data in a same sending manner. For example, if the first data is sent in a unicast manner, the second data is also sent in the unicast manner. If the first data is sent in a multicast manner, the second data is also sent in the multicast manner.

Optionally, the second SCI may be SCI sent by the first terminal device to the second terminal device before the first terminal device sends the first SCI, or the second data is data scheduled by the first terminal device before the first terminal device schedules the first data.

The data scheduled by the second SCI may further be a recent data transmission that is sent by using the same HARQ process as a data scheduled by the first SCI and that has the same communication type, source address, and destination address as the first data scheduled by the first SCI. In other words, the second NDI is an NDI, in the SCI, that is recently, previously, or last scheduled by the first terminal device, where the scheduled data and the first data are sent by using the same HARQ process, and the SCI corresponds to the data transmission having the same communication type, source address, and destination address as the first data.

Alternatively, in this embodiment of this application, the second NDI associated with the first communication type, the identifier of the first source address, the identifier of the first destination address, and the identifier of the first HARQ process may be an NDI last set by the first terminal device, where a HARQ process (for example, a HARQ process ID), a communication type, a source address, and a destination address associated with the NDI last set are the same as the HARQ process (for example, a HARQ process ID), the communication type, the source address, and the destination address associated with the first NDI, namely, the identifier of the first HARQ process, the first communication type, the identifier of the first source address, and the identifier of the first destination address.

Further, the first terminal device may determine the first NDI based on the determined second NDI and whether the first data is newly transmitted data or retransmitted data.

In a possible implementation, if the first data is newly transmitted data, the first terminal device inverts a value of the second NDI, to obtain a value of the first NDI. Alternatively, if the first data is retransmitted data, the first terminal device may determine a value of the second NDI as a value of the first NDI.

In this embodiment of this application, the NDI may have two values: a first value and a second value. In this way, inverting a value of an NDI specifically means that if a value of an NDI is the first value, the value of the NDI is inverted, to obtain the second value; or if a value of an NDI is the second value, the value of the NDI is inverted, to obtain the first value. It should be understood that in this embodiment of this application, inverting the value of the second NDI does not change the value of the second NDI, and is an operation in which the value of the second NDI is used in an inverting operation, where a result of the operation is used as the value of the first NDI. For example, the first value may be 0, and the second value may be 1. Alternatively, the first value may be 0, and the second value may be a value other than 0.

In another possible implementation, if the first data is newly transmitted data, the first terminal device may set the first NDI to a first value; or if the first data is retransmitted data, the first terminal device may set the first NDI to a second value. Alternatively, if the first data is newly transmitted data, the first terminal device may set the first NDI to the second value; or if the first data is retransmitted data, the first terminal device may set the first NDI to the first value.

The technical solutions provided in the foregoing three possible designs may be applied to a scenario in which the first terminal device corresponds to one or more source addresses, a scenario in which the second terminal device corresponds to one or more destination addresses, a unicast scenario, a multicast scenario, or a broadcast scenario.

Any SCI mentioned in this embodiment of this application may include any one or more pieces of information about the source address, information about the destination address, and information about the identifier of the HARQ process. The information about the source address or the information about the destination address may be explicitly or implicitly carried. For example, the information about the source address or the information about the destination address may exist explicitly as a field in the SCI, or may exist implicitly by using scrambled SCI.

However, it should be noted that when the technical solutions provided in the three possible designs are applied to the broadcast scenario, SCI needs to carry HARQ information, for example, an identifier of a HARQ process corresponding to transmitted data. If the SCI does not include the HARQ information, the terminal device may maintain an NDI based on a time gap between an initial transmission and a retransmission (for example, a time gap between an initial transmission and a retransmission), and a frequency domain resource location of the initial transmission and the retransmission (for example, a frequency resource location of an initial transmission and a retransmission) in the SCI. In other words, it may be understood that the identifier of the destination address and the identifier of the HARQ process in the first to the third possible designs of this application are replaced with the time gap between the initial transmission and the retransmission and the frequency domain resource location of the initial transmission and the retransmission; or the identifier of the source address, the identifier of the destination address, and the identifier of the HARQ process in the first to the third possible designs of this application are replaced with the time gap between the initial transmission and the retransmission and the frequency domain resource location of the initial transmission and the retransmission. Names used by the NDI may be different, for example, a retransmission index. This is not limited in this application.

Step S502: The first terminal device sends, through a sidelink, the first SCI and/or the first data to the second terminal device.

Step S503: The first terminal device receives, through the sidelink, the first SCI and/or the first data from the first terminal device.

Step S504: The second terminal device determines, based on the identifier of the first destination address, the identifier of the first HARQ process, and the first NDI in the first SCI, whether the first data is newly transmitted data or retransmitted data.

Corresponding to the first possible design in step S501, the second terminal device may determine, based on the identifier of the first source address, the identifier of the first HARQ process, and the first NDI in the first SCI, whether the first data is newly transmitted data or retransmitted data, or whether a transmission corresponding to the first SCI is a new transmission or a retransmission.

Specifically, the second terminal device may determine a second NDI associated with the identifier of the first source address and the identifier of the first HARQ process. The second NDI is included in second SCI. The second SCI is used to schedule second data, and the second NDI is used to indicate whether the second data is newly transmitted data or retransmitted data, that is, indicate whether a data scheduled by the second SCI is a new transmission or a retransmission. The second terminal device receives, through the sidelink, the second SCI and/or the second data sent by the first terminal device. The second data is transmitted on second sidelink grant, and the second sidelink grant is used to carry data between the first terminal device and the second terminal device.

Optionally, the second NDI is used to indicate whether a transmission on the second sidelink grant is a new transmission or a retransmission, indicate whether the second data transmitted on the second sidelink grant is newly transmitted data or retransmitted data, or determine whether the transmission corresponding to the second SCI is a new transmission or a retransmission.

Optionally, the second NDI may be an NDI that is recently, previously, or last received by the second terminal device and that is in the SCI corresponding to the second data that has the same source address as the first data, and the HARQ process associated with the second NDI is the same as the HARQ process associated with the first NDI. Alternatively, the second NDI may be an NDI last stored by the second terminal device. In addition, a HARQ process (for example, a HARQ process ID) and a source address that are associated with the NDI last stored are the same as the HARQ process (for example, a HARQ process ID) and the source address that are associated with the first NDI, namely, the identifier of the first HARQ process and the identifier of the first source address.

If a value of the second NDI is different from a value of the first NDI (inversion exists), the second terminal device may determine that the first data is newly transmitted data, or the second terminal device may determine that the transmission corresponding to the second SCI is a new transmission. If a value of the second NDI is the same as a value of the first NDI (inversion does not exist), the second terminal device may determine that the first data is retransmitted data, or the second terminal device may determine that the transmission corresponding to the second SCI is a retransmission.

Corresponding to the second possible design in step S501, the second terminal device may determine, based on the identifier of the first source address, the identifier of the first destination address, the identifier of the first HARQ process, and the first NDI in the first SCI, whether the first data is newly transmitted data or retransmitted data, or whether a transmission corresponding to the first SCI is a new transmission or a retransmission.

Specifically, the second terminal device may determine a second NDI associated with the identifier of the first source address, the identifier of the first destination address, and the identifier of the first HARQ process. The second NDI is included in second SCI. The second SCI is used to schedule second data, and the second NDI is used to indicate whether the second data is newly transmitted data or retransmitted data, that is, indicate whether a data scheduled by the second SCI is a new transmission or a retransmission. The second terminal device receives, through the sidelink, the second SCI and/or the second data sent by the first terminal device. The second data is transmitted on second sidelink grant, and the second sidelink grant is used to carry data between the first terminal device and the second terminal device.

Optionally, the second NDI is used to indicate whether a transmission on the second sidelink grant is a new transmission or a retransmission, indicate whether the second data transmitted on the second sidelink grant is newly transmitted data or retransmitted data, or determine whether the transmission corresponding to the second SCI is a new transmission or a retransmission.

Optionally, the second NDI may be an NDI that is recently, previously, or last received by the second terminal device and that is in the SCI corresponding to the second data that has the same source address and destination address as the first data, and the HARQ process associated with the second NDI is the same as the HARQ process associated with the first NDI. Alternatively, the second NDI may be an NDI last stored by the second terminal device. In addition, a HARQ process (for example, a HARQ process ID), a source address, and a destination address that are associated with the NDI last stored are the same as the HARQ process (for example, a HARQ process ID), the source address, and the destination address that are associated with the first NDI, namely, the identifier of the first HARQ process, the identifier of the first source address, and the identifier of the first destination address.

If a value of the second NDI is different from a value of the first NDI (inversion exists), the second terminal device may determine that the first data is newly transmitted data, or the second terminal device may determine that the transmission corresponding to the second SCI is a new transmission. If a value of the second NDI is the same as a value of the first NDI (inversion does not exist), the second terminal device may determine that the first data is retransmitted data, or the second terminal device may determine that the transmission corresponding to the second SCI is a retransmission.

Corresponding to the third possible design in step S501, the second terminal device may determine, based on the first communication type, the identifier of the first source address, the identifier of the first destination address, the identifier of the first HARQ process, and the first NDI in the first SCI, whether the first data is newly transmitted data or retransmitted data, or whether a transmission corresponding to the first SCI is a new transmission or a retransmission.

Specifically, the second terminal device may determine a second NDI associated with the first communication type, the identifier of the first source address, the identifier of the first destination address, and the identifier of the first HARQ process. The second NDI is included in second SCI. The second SCI is used to schedule second data, and the second NDI is used to indicate whether the second data is newly transmitted data or retransmitted data, that is, indicate whether a data scheduled by the second SCI is a new transmission or a retransmission. The second terminal device receives, through the sidelink, the second SCI and/or the second data sent by the first terminal device. The second data is transmitted on second sidelink grant, and the second sidelink grant is used to carry data between the first terminal device and the second terminal device.

Optionally, the second NDI is used to indicate whether a transmission on the second sidelink grant is a new transmission or a retransmission, indicate whether the second data transmitted on the second sidelink grant is newly transmitted data or retransmitted data, or determine whether the transmission corresponding to the second SCI is a new transmission or a retransmission.

Optionally, the second NDI may be an NDI that is recently, previously, or last received by the second terminal device and that is in the SCI corresponding to the second data that has the same communication type, source address, and destination address as the first data, and the HARQ process associated with the second NDI is the same as the HARQ process associated with the first NDI. Alternatively, the second NDI may be an NDI last stored by the second terminal device. In addition, a HARQ process (for example, a HARQ process ID), a communication type, a source address, and a destination address that are associated with the NDI last stored are the same as the HARQ process (for example, a HARQ process ID), the communication type, the source address, and the destination address that are associated with the first NDI, namely, the identifier of the first HARQ process, the first communication type, the identifier of the first source address, and the identifier of the first destination address.

If a value of the second NDI is different from a value of the first NDI (inversion exists), the second terminal device may determine that the first data is newly transmitted data, or the second terminal device may determine that the transmission corresponding to the second SCI is a new transmission. If a value of the second NDI is the same as a value of the first NDI (inversion does not exist), the second terminal device may determine that the first data is retransmitted data, or the second terminal device may determine that the transmission corresponding to the second SCI is a retransmission.

In this embodiment of this application, after determining whether the first data is newly transmitted data or retransmitted data, the second terminal device may further send, to the first terminal device, feedback information used to indicate whether the first data is correctly received. When the first data is correctly received, the second terminal device may send ACK to the first terminal device. When the first data is incorrectly received, the second terminal device may send NACK to the first terminal device.

In this embodiment of this application, before step S501, after obtaining first sidelink grant, the first terminal device may determine, in the following two manners, whether the first sidelink grant is used for a new transmission or a retransmission, and/or determine a HARQ process associated with the first sidelink grant. Alternatively, after obtaining first sidelink grant, the first terminal device may determine, in the following two manners, whether the first data transmitted on the first sidelink grant is newly transmitted data or retransmitted data, and/or determine one or more of a communication type, a source address, a destination address, or a HARQ process ID that is associated with the first sidelink grant.

Manner 1:

The first terminal device may use the first sidelink grant for a new transmission or a retransmission and/or for a HARQ process based on an indication of the network device. For example, the network device schedules the first sidelink grant by using the first DCI, where the first DCI is scrambled by using a radio network temporary identifier (radio network temporary identifier, RNTI); and obtains the first sidelink grant, where the first sidelink grant is a sidelink dynamic grant resource, and the first DCI may indicate the HARQ process ID and an NDI that are associated with the first sidelink grant. The first terminal device may determine, based on at least one of the RNTI, the HARQ process ID, and the NDI, whether the first sidelink grant is used for a new transmission or a retransmission, and/or determine a HARQ process associated with the first sidelink grant.

Optionally, that the first terminal device performs an operation based on the indication of the network device may include any one or more of the following:

(1) The first terminal device receives a PDCCH/DCI scrambled by using a first RNTI, where an NDI in the DCI is 1 or 0. Therefore, the first terminal device obtains first sidelink grant used for a retransmission, where the first sidelink grant is a sidelink dynamic grant resource, and UE may use the first sidelink grant to retransmit data that fails to be transmitted on a sidelink configured grant resource. Optionally, the first RNTI is used to scramble and schedule a retransmitted PDCCH/retransmitted DCI of the data that fails to be transmitted on the sidelink configured grant resource.

Optionally, a HARQ process of the data that fails to be transmitted on the sidelink configured grant resource corresponding to the HARQ process ID may be determined by using the HARQ process ID indicated by the DCI, and the first sidelink grant is associated with the HARQ process.

(2) The first terminal device receives a PDCCH/DCI scrambled by using a second RNTI. Therefore, the first terminal device obtains first sidelink grant, where the first sidelink grant is a sidelink dynamic grant resource. For a HARQ process ID of the DCI, if previous sidelink grant corresponding to a same HARQ process is for a first RNTI of a MAC entity or sidelink configured grant, the first sidelink grant is used for a new transmission regardless of a value of an NDI in the DCI. Optionally, the second RNTI is used to scramble and schedule a PDCCH/DCI of sidelink dynamic grant.

Optionally, a HARQ process may be determined by using the HARQ process ID indicated by the DCI, and the first sidelink grant is associated with the HARQ process.

(3) The first terminal device receives a PDCCH/DCI scrambled by using a second RNTI. Therefore, the first terminal device obtains first sidelink grant, where the first sidelink grant is a sidelink dynamic grant resource. For a HARQ process ID of the DCI, an identified HARQ process is configured for sidelink configured grant. In other words, preemption occurs, that is, the sidelink dynamic grant resource preempts a sidelink configured grant resource, and the first sidelink grant is used for a new transmission.

Optionally, a HARQ process may be determined by using the HARQ process ID indicated by the DCI, and the first sidelink grant is associated with the HARQ process.

(4) The first terminal device receives a PDCCH/DCI scrambled by using a second RNTI. Therefore, the first terminal device obtains first sidelink grant, where the first sidelink grant is a sidelink dynamic grant resource. For a HARQ process ID of the DCI, a buffer of an identified HARQ process is empty, and the first sidelink grant is used for a new transmission.

Optionally, a HARQ process may be determined by using the HARQ process ID indicated by the DCI, and the first sidelink grant is associated with the HARQ process.

(5) The first terminal device receives a PDCCH/DCI scrambled by using a second RNTI. Therefore, the first terminal device obtains first sidelink grant, where the first sidelink grant is a sidelink dynamic grant resource. For a HARQ process ID of the DCI, an identified HARQ process is configured for sidelink dynamic grant. When the NDI is not inverted, the first sidelink grant is used for a retransmission. When the NDI is inverted, the first sidelink grant is used for a new transmission.

Optionally, a HARQ process may be determined by using the HARQ process ID indicated by the DCI, and the first sidelink grant is associated with the HARQ process.

Manner 2:

The first terminal device determines to use the first sidelink grant for a new transmission or a retransmission and/or for a HARQ process.

Optionally, the first terminal device determines to use the first sidelink grant for a new transmission or a retransmission and/or for a HARQ process, when the first sidelink grant belongs to any one or more of the following resource types:

(1) a sidelink resource;
(2) sidelink resource for a mode 1;
(3) sidelink resource for a mode 2;
(4) a sidelink configured grant resource;
(5) a sidelink type 1 configured grant resource;
(6) a sidelink type 2 configured grant resource;
(7) a sidelink dynamic grant resource; and
(8) a sidelink configured grant resource set, where the sidelink configured grant resource set includes configured grant resources corresponding to one or more configured grant resource indexes. Optionally, different configured grant sets may be considered as different resource types.

Optionally, the first terminal device determines to use the first sidelink grant for a new transmission or a retransmission and/or for a HARQ process based on a resource type to which the first sidelink grant belongs. The resource type to which the first sidelink grant belongs may be configured by a network, pre-configured, determined by the first terminal device, or defined in a protocol.

For example, when the sidelink grant belongs to a sidelink configured grant resource or a sidelink resource for the mode 2, the first terminal device may determine to use the first sidelink grant for a new transmission or a retransmission and/or for a HARQ process.

When determining to use the first sidelink grant for a new transmission or a retransmission and/or for a HARQ process, the first terminal device may consider any one or more of the following factors:

(1) Whether the first terminal device has a HARQ process used for retransmission For example, if the first terminal device does not have a HARQ process used for retransmission, the first terminal device may determine to use the first sidelink grant for a new transmission.

(2) Whether a HARQ process used for retransmission can perform a retransmission on the first sidelink grant For example, the first terminal device determines a retransmission resource range or type that can be selected by the HARQ process used for retransmission. If the first sidelink grant belongs to the retransmission resource range or type that can be selected by the HARQ process used for retransmission, the first terminal device may determine to use the first sidelink grant on which the HARQ process used for retransmission performs a retransmission; otherwise, the first terminal device determines to use the first sidelink grant for a new transmission.

The retransmission resource range or type that can be selected by the HARQ process used for retransmission includes any one or more of the following: a sidelink resource; a sidelink resource for a mode 1; a sidelink resource for a mode 2; a sidelink configured grant resource; a sidelink type 1 configured grant resource; a sidelink type 2 configured grant resource; a sidelink dynamic grant resource; and a sidelink configured grant resource set, where the sidelink configured grant resource set includes configured grant resources corresponding to one or more configured grant resource indexes. Optionally, different configured grant sets may be considered as different resource types.

The retransmission resource range or type that can be selected by the HARQ process used for retransmission may be pre-configured, configured by the network device, or defined in a protocol. The network device may configure, for each logical channel (LCH), logical channel group (LCG), resource (for example, each sidelink configured grant resource or each sidelink configured grant resource set, etc.), or HARQ process, a retransmission resource range or type that can be selected by the HARQ process used for retransmission.

A purpose of distinguishing the retransmission resource range or type that can be selected by the HARQ process used for retransmission is: If a resource corresponding to the HARQ process used for retransmission is a sidelink resource for a mode 2, a retransmission may need to be performed only when sidelink grant of a sidelink for a mode 2 is obtained, and a retransmission may not be performed when a sidelink grant of a sidelink for a mode 1 is obtained.

(3) Whether a HARQ Process Used for Retransmission has a Remaining Resource

Optionally, whether the HARQ process used for retransmission has a remaining resource (for example, a resource selected and/or reserved for repetition (repetition)) is determined.

For example, for a transmission of one TB, UE selects and/or reserves resources for four times, but four transmissions do not succeed, and the UE needs to continue to obtain a retransmission resource. If three transmissions do not succeed, the previously selected and/or reserved resource may continue to be used for a retransmission, and a retransmission resource does not need to be re-obtained. When determining that a HARQ process used for retransmission does not have a remaining repetition resource, the first terminal device may determine to use the first sidelink grant on which the HARQ process used for retransmission performs a retransmission; otherwise, determine to use the first sidelink grant for a new transmission.

(4) Priority of Data Transmitted by Using a HARQ Process Used for Retransmission For example, if a plurality of HARQ processes perform a retransmission, the first terminal device may determine a highest priority of data transmitted by using a HARQ process used for retransmission, and determine to use the first sidelink grant on which the HARQ process is used to transmit the data. When determining a priority of data transmitted by using a HARQ process used for retransmission, the first terminal device may determine to use the first sidelink grant on which a HARQ process is used to retransmit the data with a highest priority.

Optionally, the priority includes quality of service (QoS) information, a ProSe per-packet priority (PPPP) value, a priority of a logical channel in a MAC PDU, a priority of a logical channel with a highest priority in a MAC PDU, or the like.

Optionally, priorities of logical channels are compared based on priorities of logical channels on which two or more pieces of data are located.

(5) Priorities of Data Transmitted by Using a HARQ Process Used for Retransmission and Data that Needs to be Newly Transmitted For example, the first terminal device has data needs to be newly transmitted and data needs to be retransmitted. The first terminal device may compare priorities of the data, and determine to use the first sidelink grant to transmit data with a higher priority. The first terminal device has a HARQ process used for retransmission and data that needs to be newly transmitted. The first terminal device compares priorities of data transmitted by using the HARQ process used for retransmission and data that needs to be newly transmitted. If the priority of the data transmitted by using the HARQ process used for retransmission is higher than the priority of the data that needs to be newly transmitted, the first terminal device may determine to use the first sidelink grant on which the HARQ process used for retransmission performs a retransmission; otherwise, determine to use the first sidelink grant for a new transmission.

Optionally, the priority includes quality of service (quality of service, QoS) information, a ProSe per-packet priority (ProSe per-packet priority, PPPP) value, a priority of a logical channel in a MAC PDU, a priority of a logical channel with a highest priority in a MAC PDU, or the like.

Optionally, priorities of logical channels are compared based on priorities of logical channels on which the two pieces of data are located.

(6) Size of the First Sidelink Grant

For example, the first terminal device determines whether the first sidelink grant can accommodate data that needs to be retransmitted or data that needs to be newly transmitted. The first terminal device determines a size of data transmitted by using a HARQ process used for retransmission. If the first sidelink grant can accommodate data that needs to be retransmitted, the first terminal device may determine to use the first sidelink grant on which the HARQ process used for retransmission performs a retransmission; otherwise, determine to use the first sidelink grant for a new transmission.

Based on one or more of the foregoing conditions, the first terminal device determines whether the first sidelink grant is used for a new transmission or a retransmission and for a HARQ process.

For example, a HARQ process performing a retransmission on the first sidelink grant is determined, and the HARQ process corresponding to the first sidelink grant is determined. In other words, a correspondence between the first sidelink grant and any one or more of a communication type, a source address, a destination address, or a HARQ process ID is determined.

When determining is performed based on the foregoing conditions, a sequence of using the conditions is not limited in this application. In addition, a combination of the conditions is not limited in this application.

For example, the first terminal device obtains the first sidelink grant, the first terminal device has three HARQ processes (which are separately marked as a HARQ process 1, a HARQ process 2, and a HARQ process 3) used for retransmission, and the first sidelink grant does not belong to a retransmission resource range that can be selected by the HARQ process 1 used for retransmission. Therefore, the first sidelink grant cannot be used to retransmit the HARQ process 1. The first sidelink grant belongs to retransmission resource ranges that can be selected by the HARQ process 2 and the HARQ process 3 that are used for retransmission, and can accommodate data that needs to be retransmitted by using the HARQ process 2 and data that needs to be retransmitted by using the HARQ process 3. A priority of the data that needs to be retransmitted by using the HARQ process 2 is higher than a priority of the data that needs to be retransmitted by using the HARQ process 3, and the HARQ process 2 does not have a remaining repetition resource. Therefore, the first terminal device determines to use the first sidelink grant to retransmit the HARQ process 2 used for retransmission, that is, determines to use the first sidelink grant on which a HARQ process associated with the first sidelink grant performs a retransmission. In other words, the first terminal device determines that the first data transmitted on the first sidelink grant is retransmitted data, and any one or more of the first communication type, the identifier of the first source address, the identifier of the first destination address, and the identifier of the first HARQ process that are associated with the first sidelink grant.

For example, the first terminal device obtains the first sidelink grant, the first terminal device has one HARQ process (which is marked as a HARQ process 1) used for retransmission and data that needs to be newly transmitted, and the first sidelink grant belongs to a retransmission resource range that can be selected by the HARQ process 1 used for retransmission. In addition, the first sidelink grant can accommodate data that needs to be retransmitted by using the HARQ process 1, and a priority of the data that needs to be retransmitted by using the HARQ process 1 is lower than a priority of the data that needs to be newly retransmitted. Therefore, the first terminal device determines to use the first sidelink grant for a new transmission, that is, determines to use the first sidelink grant on which a HARQ process associated with the first sidelink grant performs a new transmission. In other words, the first terminal device determines that the first data transmitted on the first sidelink grant is newly transmitted data, and any one or more of the first communication type, the identifier of the first source address, the identifier of the first destination address, and the identifier of the first HARQ process that are associated with the first sidelink grant.

It should be noted that the foregoing technical solutions may be executed by a MAC entity in a terminal device, or may be executed by a HARQ entity (for example, an SL HARQ entity) in a terminal device.

Optionally, on a transmit end, the MAC entity in the terminal device is specifically configured to: set, determine, or maintain HARQ information (for example, an identifier of a HARQ process and an NDI), and transfer first sidelink grant and the associated HARQ information to a corresponding HARQ entity.

Optionally, the terminal device may determine the corresponding HARQ entity by using any one of more of a resource configuration mode (for example, a sidelink for a mode 1 or a sidelink for a mode 2), a communication type (for example, unicast, multicast, or broadcast), a source address (for example, an identifier of the source address), and a destination address (for example, an identifier of the destination address).

Optionally, on a transmit end, the HARQ entity is specifically configured to: obtain a to-be-transmitted media access control (MAC) protocol data unit (protocol data unit, PDU) from a multiplexing and assembly entity (Multiplexing and assembly entity), and send the MAC PDU and HARQ information to a corresponding HARQ process for a transmission.

Optionally, on a receive end, for each transmission time interval (TTI) with valid SCI (for example, each symbol, slot, subframe or frame), the MAC entity in the terminal device is specifically configured to transfer SCI information and associated HARQ information (for example, an identifier of a HARQ process and an NDI) to a corresponding HARQ entity.

Optionally, the terminal device may determine the corresponding HARQ entity by using any one of more of a resource configuration mode (for example, a sidelink for a mode 1 or a sidelink for a mode 2), a communication type (for example, unicast, multicast, or broadcast), a source address (for example, an identifier of the source address), and a destination address (for example, an identifier of the destination address).

Optionally, on a receive side, for each TTI of an SL-SCH, the SL HARQ entity is specifically configured to: allocate a TB and associated HARQ information that are received from a physical layer to a HARQ process, and determine, based on whether an NDI is inverted, whether the received TB is newly transmitted or retransmitted.

The following uses a specific example to describe an example of the method provided in the foregoing embodiments. The first possible design, the second possible design, and the third possible design are separately described by using examples.

For the first possible design, for example, as shown in FIG. 6, transmit UE may maintain an NDI based on a same destination address and HARQ process ID. Step 1: Transmit UE 1 (source address 1) sends data (for example, data 1) to receive UE 1 (destination address 1) by using a HARQ process ID (HARQ process ID) 1, where the data 1 is newly transmitted data, and an NDI is set to 0; and receives ACK feedback from the receive UE 1 for the transmission. The transmit UE 1 considers that the transmission in step 1 succeeds. Step 2: The transmit UE 1 (source address 1) sends data (for example, data 2) to receive UE 2 (destination address 2) by using the HARQ process ID (HARQ process ID) 1, where the data 2 is newly transmitted data, and an NDI is set to 1; and receives ACK feedback from the receive UE 2 for the transmission. Step 3: The transmit UE 1 (source address 1) sends data (for example, data 3) to the receive UE 1 (destination address 1) by using the HARQ process ID (HARQ process ID) 1, where the data 3 is newly transmitted data. In this case, because the destination address and the HARQ process ID that are associated with the NDI in step 1 is the same as the destination address and the HARQ process ID that are associated with an NDI in step 3, and the NDI in step 1 is a previous NDI of the NDI in step 3, the transmit UE 1 should set the NDI in step 3 based on a value of the NDI in step 1. In addition, the data 1 transmitted in step 3 is newly transmitted data. Therefore, the NDI in step 3 should be obtained through inverting the NDI in step 1, and set to 1.

For the first possible design, for example, as shown in FIG. 7, receive UE may determine whether a transmission is a new transmission or a retransmission based on a same source address and whether an NDI corresponding to a HARQ process ID is inverted. Step 1: Receive UE 1 (destination address 1) receives data (for example, data 1) sent by transmit UE 1 (source address 1) by using a HARQ process ID (HARQ process ID) 1, where an NDI is set to 0, and the data 1 is newly transmitted data; and successfully receives the data 1 and feeds back ACK of the transmission to the transmit UE 1. Step 2: The receive UE 1 (destination address 1) receives data (for example, data 2) sent by transmit UE 2 (source address 2) by using the HARQ process ID (HARQ process ID) 1, where an NDI is set to 1, and the data 2 is newly transmitted data; and successfully receives the data 2 and feeds back ACK of the transmission to the transmit UE 2. Step 3: The receive UE 1 (destination address 1) receives the data (for example, the data 1) sent by the transmit UE 1 (source address 1) by using the HARQ process ID (HARQ process ID) 1, where an NDI is set to 1. Source addresses and HARQ process IDs in step 1 and step 3 are the same. The receive UE 1 determines, based on whether the NDI in step 3 is inverted based on the NDI in step 1, whether the transmission in step 3 is a new transmission or a retransmission. Compared with the NDI in step 1, the NDI in step 3 is inverted. Therefore, the receive UE 1 can correctly determine that the transmission in step 3 is a new transmission, and the data 1 transmitted in step 3 is newly transmitted data.

For the second possible design, for example, as shown in FIG. 8, transmit UE may maintain an NDI based on a same source address, destination address, and HARQ process ID. Step 1: Transmit UE 1 (source address 1) sends data (for example, data 1) to receive UE 1 (destination address 1) by using a HARQ process ID (HARQ process ID) 1, where the data 1 is newly transmitted data, and an NDI is set to 0; and receives ACK feedback from the receive UE 1 for the transmission. The transmit UE 1 considers that the transmission in step 1 succeeds. Step 2: The transmit UE 1 (source address 2) sends data (for example, data 2) to receive UE 2 (destination address 2) by using the HARQ process ID (HARQ process ID) 1, where the data 2 is newly transmitted data, and an NDI is set to 1; and receives ACK feedback from the receive UE 2 for the transmission. Step 3: The transmit UE 1 (source address 1) sends data (for example, data 3) to the receive UE 1 (destination address 1) by using the HARQ process ID (HARQ process ID) 1, where the data 3 is newly transmitted data. In this case, because the source address, the destination address, and the HARQ process ID that are associated with the NDI in step 1 is the same as the source address, the destination address, and the HARQ process ID that are associated with an NDI in step 3, and the NDI in step 1 is a previous NDI of the NDI in step 3, the transmit UE 1 should set the NDI in step 3 based on a value of the NDI in step 1. In addition, the data 1 transmitted in step 3 is newly transmitted data. Therefore, the NDI in step 3 should be obtained through inverting the NDI in step 1, and set to 1.

For the second possible design, for example, as shown in FIG. 8, receive UE may determine whether a transmission is a new transmission or a retransmission based on a same source address and destination address, and whether an NDI corresponding to a HARQ process ID is inverted. Step 1: Receive UE 1 (destination address 1) receives data (for example, data 1) sent by transmit UE 1 (source address 1) by using a HARQ process ID (HARQ process ID) 1, where an NDI is set to 0, and the data 1 is newly transmitted data; and successfully receives the data 1 and feeds back ACK of the transmission to the transmit UE 1. Step 2: The receive UE 1 (destination address 2) receives data (for example, data 2) sent by transmit UE 2 (source address 2) by using the HARQ process ID (HARQ process ID) 1, where an NDI is set to 1, and the data 1 is newly transmitted data; and successfully receives the data 2 and feeds back ACK of the transmission to the transmit UE 2. Step 3: The receive UE 1 (destination address 1) receives the data (for example, the data 1) sent by the transmit UE 1 (source address 1) by using the HARQ process ID (HARQ process ID) 1, where an NDI is set to 1. Source addresses, destination addresses, and HARQ process IDs in step 1 and step 3 are the same. The receive UE 1 determines, based on whether the NDI in step 3 is inverted based on the NDI in step 1, whether the transmission in step 3 is a new transmission or a retransmission. Compared with the NDI in step 1, the NDI in step 3 is inverted. Therefore, the receive UE 1 can correctly determine that the transmission in step 3 is a new transmission, and the data 1 transmitted in step 3 is newly transmitted data.

For the third possible design, for example, as shown in FIG. 9, transmit UE may maintain an NDI based on a same broadcast type, source address, destination address, and HARQ process ID. Step 1: Transmit UE 1 (source address 1) sends data (for example, data 1) to receive UE 1 (destination address 1) by using a HARQ process ID (HARQ process ID) 1, where the data 1 is newly transmitted data, an NDI is set to 0, and the data transmission is unicast communication; and receives ACK feedback from the receive UE 1 for the transmission. The transmit UE 1 considers that the transmission in step 1 succeeds. Step 2: The transmit UE 1 (source address 1) sends data (for example, data 2) to the receive UE 1 (destination address 1) by using the HARQ process ID (HARQ process ID) 1, where the data 2 is newly transmitted data, an NDI is set to 1, and the data transmission is multicast communication; and receives ACK feedback from the receive UE 1 for the transmission. Step 3: The transmit UE 1 (source address 1) sends data (for example, data 3) to the receive UE 1 (destination address 1) by using the HARQ process ID (HARQ process ID) 1, where the data 3 is newly transmitted data, and the data transmission is unicast communication. In this case, because the broadcast type, the source address, the destination address, and the HARQ process ID that are associated with the NDI in step 1 is the same as the broadcast type, the source address, the destination address, and the HARQ process ID that are associated with an NDI in step 3, and the NDI in step 1 is a previous NDI of the NDI in step 3, the transmit UE 1 should set the NDI in step 3 based on a value of the NDI in step 1. In addition, the data 1 transmitted in step 3 is newly transmitted data. Therefore, the NDI in step 3 should be obtained through inverting the NDI in step 1, and set to 1.

For the third possible design, for example, as shown in FIG. 9, receive UE may determine whether a transmission is a new transmission or a retransmission based on a same broadcast type, source address, and destination address, and whether an NDI corresponding to a HARQ process ID is inverted. Step 1: Receive UE 1 (destination address 1) receives data (for example, data 1) sent by transmit UE 1 (source address 1) by using a HARQ process ID (HARQ process ID) 1, where an NDI is set to 0, the data 1 is newly transmitted data, and the data transmission is unicast communication; and successfully receives the data 1 and feeds back ACK of the transmission to the transmit UE 1. Step 2: The receive UE 1 (destination address 1) receives data (for example, data 2) sent by the transmit UE 1 (source address 1) by using the HARQ process ID (HARQ process ID) 1, where an NDI is set to 1, the data 2 is newly transmitted data, and the data transmission is multicast communication; and successfully receives the data 2 and feeds back ACK of the transmission to the transmit UE 1. Step 3: The receive UE 1 (destination address 1) receives the data (for example, the data 1) sent by the transmit UE 1 (source address 1) by using the HARQ process ID (HARQ process ID) 1, where an NDI is set to 1, and the data transmission is unicast communication. Broadcast types, source addresses, destination addresses, and HARQ process IDs in step 1 and step 3 are the same. The receive UE 1 determines, based on whether the NDI in step 3 is inverted based on the NDI in step 1, whether the transmission in step 3 is a new transmission or a retransmission. Compared with the NDI in step 1, the NDI in step 3 is inverted. Therefore, the receive UE 1 can correctly determine that the transmission in step 3 is a new transmission, and the data 1 transmitted in step 3 is newly transmitted data.

Figure 10:
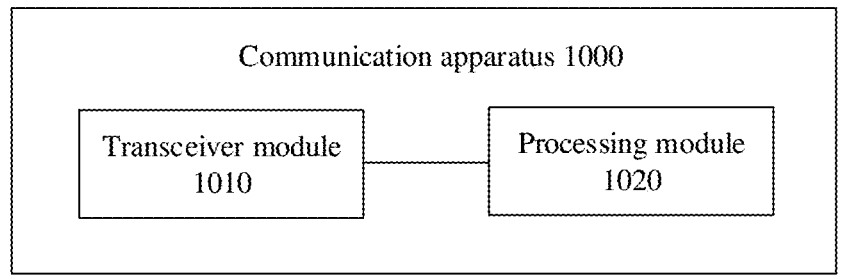
FIG. 10 is a schematic diagram of a structure of another communication apparatus according to an embodiment of this application.

An embodiment of this application further provides a communication apparatus. FIG. 10 is a schematic diagram of a structure of a communication apparatus 1000 according to an embodiment of this application. The communication apparatus 1000 includes a transceiver module 1010 and a processing module 1020. The communication apparatus may be configured to implement a function of the terminal device in any one of the foregoing method embodiments. For example, the communication apparatus may be a terminal device, for example, a handheld terminal device or a vehicle-mounted terminal device. Alternatively, the communication apparatus may be a chip included in a terminal device, or an apparatus including a terminal device, for example, various types of vehicles.

When the communication apparatus serves as the first terminal device to perform the method embodiment shown in FIG. 4, the processing module 1020 is configured to determine a first new data indicator NDI based on an identifier of a first destination address and an identifier of a first hybrid automatic repeat request HARQ process, where the first NDI is included in first sidelink control information SCI, and the first SCI is used to schedule first data; and the transceiver module 1010 is configured to send, through a sidelink, the first SCI and/or the first data to a second terminal device.

In a possible design, the processing module 1020 is configured to: determine the first NDI based on an identifier of a first source address, the identifier of the first destination address, and the identifier of the first HARQ process; or determine the first NDI based on a first communication type, an identifier of a first source address, the identifier of the first destination address, and the identifier of the first HARQ process. The first communication type includes any one or more of the following: unicast, multicast, and broadcast.

In a possible design, the processing module 1020 is configured to determine the first NDI based on a second NDI and whether the first data is newly transmitted data or retransmitted data, where the second NDI is included in second SCI, the second SCI is used to schedule second data, and the second NDI is used to indicate whether the second data is newly transmitted data or retransmitted data. The second NDI is associated with the identifier of the first destination address and the identifier of the first HARQ process; the second NDI is associated with the identifier of the first source address, the identifier of the first destination address, and the identifier of the first HARQ process; or the second NDI is associated with the first communication type, the identifier of the first source address, the identifier of the first destination address, and the identifier of the first HARQ process.

In a possible design, the processing module 1020 is further configured to obtain a value of the first NDI in any one or more of the following manners: If the first data is newly transmitted data, invert a value of the second NDI, to obtain the value of the first NDI; or if the first data is retransmitted data, determine that the value of the first NDI is the same as a value of the second NDI.

In a possible design, the first SCI includes any one or more of the following: information about the first source address, information about the first destination address, and information about the identifier of the first HARQ process.

When the communication apparatus serves as the second terminal device to perform the method embodiment shown in FIG. 4, the transceiver module 1010 is configured to receive, through a sidelink, first sidelink control information SCI and/or first data from a first terminal device, where the first SCI is used to schedule the first data. The processing module 1020 is configured to determine, based on an identifier of a first source address, an identifier of a first hybrid automatic repeat request HARQ process, and a first new data indicator NDI in the first SCI, whether the first data is newly transmitted data or retransmitted data.

In a possible design, the processing module 1020 is configured to: determine, based on the identifier of the first source address, an identifier of a first destination address, the identifier of the first HARQ process, and the first NDI in the first SCI, whether the first data is newly transmitted data or retransmitted data; or determine, based on a first communication type, the identifier of the first source address, an identifier of a first destination address, the identifier of the first HARQ process, and the first NDI in the first SCI, whether the first data is newly transmitted data or retransmitted data, where the first communication type includes any one or more of the following: unicast, multicast, and broadcast.

In a possible design, the processing module 1020 is configured to: determine, based on the first NDI and a second NDI associated with the identifier of the first source address and the identifier of the first HARQ process, whether the first data is newly transmitted data or retransmitted data, where the second NDI is included in second SCI, the second SCI is used to schedule second data, and the second NDI is used to indicate whether the second data is newly transmitted data or retransmitted data; determine, based on the first NDI and a second NDI associated with the identifier of the first source address, the identifier of the first destination address, and the identifier of the first HARQ process, whether the first data is newly transmitted data or retransmitted data; or determine, based on the first NDI and a second NDI associated with the first communication type, the identifier of the first source address, the identifier of the first destination address, and the identifier of the first HARQ process, whether the first data is newly transmitted data or retransmitted data.

In a possible design, if a value of the first NDI is different from a value of the second NDI, the processing module 1020 determines that the first data is newly transmitted data; or if a value of the first NDI is the same as a value of the second NDI, the processing module 1020 determines that the first data is retransmitted data.

In a possible design, the first SCI includes any one or more of the following: information about the first source address, information about the first destination address, and information about the identifier of the first HARQ process.

The processing module 1020 in the communication apparatus may be implemented by a processor or a processor-related circuit component, and the transceiver module 1010 may be implemented by a transceiver or a transceiver-related circuit component. Operations and/or functions of the modules in the communication apparatus are separately intended to implement corresponding procedures of the method shown in FIG. 4. For brevity, details are not described herein again.

Figure 11:
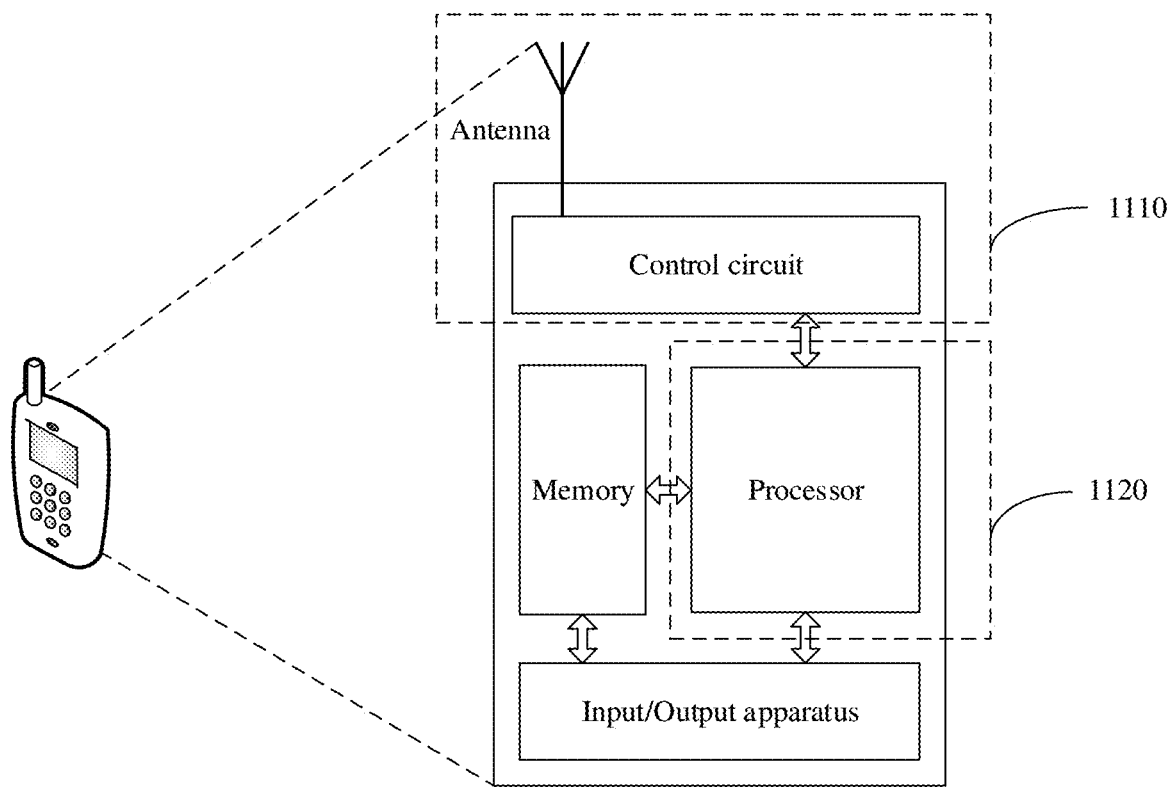
FIG. 11 is a schematic diagram of a structure of another communication apparatus according to an embodiment of this application.

FIG. 11 is a schematic diagram of another structure of another communication apparatus according to an embodiment of this application. The communication apparatus may be specifically a terminal device. For ease of understanding and ease of illustration, in FIG. 11, a mobile phone is used as an example of the terminal device. As shown in FIG. 11, the terminal device includes a processor, a memory, a radio frequency circuit, an antenna, an input/output apparatus, and the like. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display screen, or a keyboard, is mainly configured to: receive data entered by a user, and output data to the user. It should be noted that some types of terminal devices may not have an input/output apparatus.

When data needs to be sent, the processor performs baseband processing on to-be-sent data, and outputs a baseband signal to the radio frequency circuit. The radio frequency circuit performs radio frequency processing on the baseband signal, and then sends a radio frequency signal to the outside in a form of an electromagnetic wave through the antenna. When data is sent to the terminal device, the radio frequency circuit receives a radio frequency signal by using the antenna, converts the radio frequency signal into a baseband signal, and outputs the baseband signal to the processor. The processor converts the baseband signal into data and processes the data. For ease of description, FIG. 11 shows only one memory and one processor. An actual terminal device product may include one or more processors and one or more memories. The memory may also be referred to as a storage medium, a storage device, or the like. The memory may be disposed independently of the processor, or may be integrated with the processor. This is not limited in embodiments of this application.

In this embodiment of this application, the antenna that has sending and receiving functions and the radio frequency circuit may be considered as a transceiver unit of the terminal device, and the processor that has a processing function may be considered as a processing unit of the terminal device. As shown in FIG. 11, the terminal device includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. In other words, the transceiver unit 1110 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like. It should be understood that the transceiver unit 1110 is configured to perform a sending operation and a receiving operation on the terminal device side in the foregoing method embodiments, and the processing unit 1120 is configured to perform an operation other than the receiving and sending operations of the terminal device in the foregoing method embodiments.

An embodiment of this application further provides a chip system, including a processor, where the processor is coupled to a memory. The memory is configured to store a program or instructions. When the program or the instructions is/are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on chip (SoC), a central processing unit (CPU), a network processor (NP), a digital signal processor (DSP), a micro controller unit (MCU), or a programmable logic device (PLD) or another integrated chip.

It should be understood that steps in the foregoing method embodiment may be implemented by using a hardware integrated logical circuit in the processor or instructions in a form of software. The steps of the method disclosed with reference to embodiments of this application may be directly performed and completed by a hardware processor, or may be performed and completed by using a combination of hardware in the processor and a software module.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a network device and at least one terminal device described in the foregoing method embodiments.

It should be understood that, the processor mentioned in embodiments of this application may be a central processing unit (CPU), the processor may further be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may further be understood that the memory mentioned in embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on implementation processes of embodiments of the present invention.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected according to actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes various media that can store program code, such as a USB flash drive, a removable hard disk drive, a read-only memory (ROM), a random access memory (RAM), a magnetic disk, and an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a first terminal device, a value of a first new data indicator (NDI) using an identifier of a first destination address and an identifier of a first hybrid automatic repeat request (HARQ) process, wherein the first NDI is comprised in first sidelink control information (SCI), and the first SCI schedules first data; and
   sending, by the first terminal device through a sidelink, the first SCI or the first data to a second terminal device.

2. The method according to claim 1, wherein determining, by the first terminal device, the value of the first NDI comprises:
   determining, by the first terminal device, the value of the first NDI using a first communication type, an identifier of a first source address, the identifier of the first destination address, and the identifier of the first HARQ process, wherein the first communication type comprises any one or more of the following: unicast, groupcast, or broadcast.

3. The method according to claim 1, wherein determining, by the first terminal device, the value of the first NDI comprises:
   determining, by the first terminal device, a second NDI based on the identifier of the first destination address and the identifier of the first HARQ process; and
   determining, by the first terminal device, the value of the first NDI using the second NDI and whether the first data is newly transmitted data or retransmitted data;
   wherein the second NDI is comprised in second SCI, the second SCI schedules second data, and the second NDI indicates whether the second data is newly transmitted data or retransmitted data; and
   wherein:
      the second NDI is associated with a first communication type, an identifier of a first source address, the identifier of the first destination address, and the identifier of the first HARQ process, and wherein the first communication type comprises any one or more of the following: unicast, groupcast, or broadcast.

4. The method according to claim 3, wherein the value of the first NDI is obtained in any one or more of the following manners:
   when the first data is newly transmitted data, toggling, by the first terminal device, a value of the second NDI, to obtain the value of the first NDI; or
   when the first data is retransmitted data, determining, by the first terminal device, that the value of the first NDI is the same as a value of the second NDI.

5. The method according to claim 1, wherein the first SCI further comprises any one or more of the following:
   information about a first source address, information about the first destination address, or information about the identifier of the first HARQ process.

6. A method, comprising:
   receiving, by a second terminal device through a sidelink, first sidelink control information (SCI) or first data from a first terminal device, wherein the first SCI schedules the first data; and
   determining, by the second terminal device using an identifier of a first source address, an identifier of a first hybrid automatic repeat request (HARQ) process, and a value of a first new data indicator (NDI) in the first SCI, whether the first data is newly transmitted data or retransmitted data.

7. The method according to claim 6, wherein determining, by the second terminal device using the identifier of the first source address, the identifier of the first HARQ process, and the value of the first NDI in the first SCI, whether the first data is newly transmitted data or retransmitted data comprises:
   determining, by the second terminal device using a first communication type, the identifier of the first source address, an identifier of a first destination address, the identifier of the first HARQ process, and the value of the first NDI in the first SCI, whether the first data is newly transmitted data or retransmitted data, wherein the first communication type comprises any one or more of the following: unicast, groupcast, or broadcast.

8. The method according to claim 6, wherein determining, by the second terminal device using the identifier of the first source address, the identifier of the first HARQ process, and the value of the first NDI, whether the first data is newly transmitted data or retransmitted data comprises:
   determining, by the second terminal device using the value of the first NDI, and a value of a second NDI associated with a first communication type, the identifier of the first source address, an identifier of a first destination address, and the identifier of the first HARQ process, whether the first data is newly transmitted data or retransmitted data, wherein the first communication type comprises any one or more of the following: unicast, groupcast, or broadcast, and wherein the second NDI is comprised in second SCI, the second SCI schedules second data, and the second NDI indicates whether the second data is newly transmitted data or retransmitted data.

9. The method according to claim 8, wherein determining, by the second terminal device using the first NDI and the value of the second NDI associated with the first communication type, the identifier of the first source address, the identifier of the first destination address, and the identifier of the first HARQ process, whether the first data is newly transmitted data or retransmitted data comprises:
   when the value of the first NDI is different from the value of the second NDI, determining, by the second terminal device, that the first data is newly transmitted data; or
   when the value of the first NDI is the same as the value of the second NDI, determining, by the second terminal device, that the first data is retransmitted data.

10. The method according to claim 6, wherein the first SCI further comprises any one or more of the following:
    information about the first source address, information about a first destination address, or information about the identifier of the first HARQ process.

11. An apparatus, comprising:
    at least one processor; and
    a non-transitory computer-readable storage medium storing a program that is executable by the at least one processor, the program including instructions to:
       determine a value of a first new data indicator (NDI) using an identifier of a first destination address and an identifier of a first hybrid automatic repeat request (HARQ) process, wherein the first NDI is comprised in first sidelink control information (SCI), and the first SCI schedules first data; and
       send, through a sidelink, the first SCI or the first data to a second terminal device.

12. The apparatus according to claim 11, wherein the program further includes instructions to:
- determine the value of the first NDI using a first communication type, an identifier of a first source address, the identifier of the first destination address, and the identifier of the first HARQ process, wherein the first communication type comprises any one or more of the following: unicast, groupcast, or broadcast.

13. The apparatus according to claim 11, wherein the program further includes instructions to:
- determine a second NDI based on the identifier of the first destination address and the identifier of the first HARQ process; and
- determine the value of the first NDI using the second NDI and whether the first data is newly transmitted data or retransmitted data, wherein the second NDI is comprised in second SCI, the second SCI schedules second data, and the second NDI indicates whether the second data is newly transmitted data or retransmitted data, and wherein:
- the second NDI is associated with a first communication type, an identifier of a first source address, the identifier of the first destination address, and the identifier of the first HARQ process, and wherein the first communication type comprises any one or more of the following: unicast, groupcast, or broadcast.

14. The apparatus according to claim 13, wherein the program further includes instructions to:
- when the first data is newly transmitted data, toggle a value of the second NDI, to obtain the value of the first NDI; or
- when the first data is retransmitted data, determine that the value of the first NDI is the same as a value of the second NDI.

15. The apparatus according to claim 11, wherein the first SCI further comprises any one or more of the following:
- information about a first source address, information about the first destination address, or information about the identifier of the first HARQ process.

16. A communication apparatus, comprising:
- at least one processor; and
- a non-transitory computer-readable storage medium storing a program that is executable by the at least one processor, the program including instructions to:
  - receive, through a sidelink, first sidelink control information (SCI) or first data from a first terminal device, wherein the first SCI schedules the first data; and
  - determine, using an identifier of a first destination address, an identifier of a first hybrid automatic repeat request (HARQ) process, and using a value of a first new data indicator (NDI) in the first SCI, whether the first data is newly transmitted data or retransmitted data.

17. The apparatus according to claim 16, wherein the program further includes instructions to:
- determine, using a first communication type, an identifier of a first source address, the identifier of the first destination address, the identifier of the first HARQ process, and the value of the first NDI in the first SCI, whether the first data is newly transmitted data or retransmitted data, wherein the first communication type comprises any one or more of the following: unicast, groupcast, or broadcast.

18. The apparatus according to claim 16, wherein the program further includes instructions to:
- determine, using the value of the first NDI and a value of a second NDI associated with a first communication type, an identifier of a first source address, the identifier of the first destination address, and the identifier of the first HARQ process, whether the first data is newly transmitted data or retransmitted data, and wherein the first communication type comprises any one or more of the following: unicast, groupcast, or broadcast.

19. The apparatus according to claim 18, wherein the program includes instructions to:
- when the value of the first NDI is different from the value of the second NDI, determine that the first data is newly transmitted data; or
- when the value of the first NDI is the same as the value of the second NDI, determine that the first data is retransmitted data.

20. The apparatus according to claim 16, wherein the first SCI further comprises any one or more of the following:
- information about a first source address, information about the first destination address, or information about the identifier of the first HARQ process.

* * * * *